(12) United States Patent
Shigiya et al.

(10) Patent No.: US 11,202,023 B2
(45) Date of Patent: Dec. 14, 2021

(54) IMAGING DEVICE AND IMAGING SYSTEM

(71) Applicant: CANON KABUSHIKI KAISHA, Tokyo (JP)

(72) Inventors: Yoshiko Shigiya, Tokyo (JP); Noriyuki Shikina, Tokyo (JP); Shintaro Takenaka, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/198,848

(22) Filed: Mar. 11, 2021

(65) Prior Publication Data

US 2021/0306577 A1 Sep. 30, 2021

(30) Foreign Application Priority Data

Mar. 24, 2020 (JP) .............................. JP2020-052797

(51) Int. Cl.
| | |
|---|---|
| *H04N 5/232* | (2006.01) |
| *H04N 5/335* | (2011.01) |
| *H04N 5/353* | (2011.01) |
| *H04N 5/3745* | (2011.01) |
| *H04N 5/378* | (2011.01) |

(52) U.S. Cl.
CPC ............. *H04N 5/353* (2013.01); *H04N 5/378* (2013.01); *H04N 5/37452* (2013.01); *H04N 5/37455* (2013.01)

(58) Field of Classification Search
CPC ...... H04N 5/353; H04N 5/378; H04N 5/3745; H04N 5/37455; H04N 5/37452
See application file for complete search history.

(56) References Cited

U.S. PATENT DOCUMENTS

| | | | |
|---|---|---|---|
| 7,999,866 B2 | 8/2011 | Sonoda et al. | 348/245 |
| 8,049,799 B2 | 11/2011 | Sonoda et al. | 348/294 |
| 8,081,246 B2 | 12/2011 | Takenaka | 348/307 |
| 8,305,473 B2 | 11/2012 | Takenaka et al. | 348/300 |
| 8,363,137 B2 | 1/2013 | Sonoda et al. | 348/302 |
| 8,466,994 B2 | 6/2013 | Takenaka | 348/307 |

(Continued)

FOREIGN PATENT DOCUMENTS

| | | |
|---|---|---|
| JP | 2002-330429 A | 11/2002 |
| JP | 2013-211833 A | 10/2013 |

(Continued)

*Primary Examiner* — Kelly L Jerabek
(74) *Attorney, Agent, or Firm* — Venable LLP

(57) ABSTRACT

An imaging device includes pixels, output lines on each column, an AD conversion unit including column AD conversion circuits connected to the output lines, a first storage unit including holding units connected to the column AD conversion circuits, a transfer unit that transfers signals in the first storage unit, a second storage unit that holds signals from the transfer unit, and an output unit that outputs signals in the second storage unit. The pixels output a first analog signal based on signal from the first photoelectric converter and a second analog signal based on signal from the first and second photoelectric converter. The AD conversion unit converts the first and second analog signals into first and second digital signals. The number of signals corresponding to the first digital signals of signals output by the output unit is less than the number of signals output in parallel from the output lines.

15 Claims, 19 Drawing Sheets

(56) References Cited

U.S. PATENT DOCUMENTS

| | | | |
|---|---|---|---|
| 8,670,058 B2 | 3/2014 | Hayashi et al. | 348/296 |
| 9,654,697 B2 | 5/2017 | Takenaka et al. | H04N 5/2353 |
| 9,843,752 B2 | 12/2017 | Yamamoto et al. | H04N 5/3698 |
| 10,277,839 B2 | 4/2019 | Takenaka et al. | H04N 5/376 |
| 10,389,964 B2 | 8/2019 | Taniguchi et al. | H04N 5/376 |
| 10,547,794 B2 | 1/2020 | Takenaka et al. | H04N 5/2357 |
| 10,645,316 B2 | 5/2020 | Shigiya et al. | H04N 5/36963 |
| 10,659,713 B2 | 5/2020 | Shikina | H04N 5/3741 |
| 10,750,103 B2 | 8/2020 | Takenaka et al. | H04N 5/347 |
| 2011/0267513 A1 | 11/2011 | Sonoda et al. | 348/294 |
| 2012/0013778 A1 | 1/2012 | Sonoda et al. | 348/294 |
| 2013/0070135 A1* | 3/2013 | Bahukhandi | H04N 5/3742 348/300 |
| 2015/0062394 A1* | 3/2015 | Ikeda | H04N 5/345 348/301 |
| 2015/0129744 A1 | 5/2015 | Sonoda et al. | 250/206 |
| 2016/0073016 A1 | 3/2016 | Ohya et al. | 348/207.1 |
| 2018/0249110 A1* | 8/2018 | Kobayashi | H04N 5/37457 |
| 2019/0068910 A1 | 2/2019 | Taniguchi | |
| 2019/0104261 A1 | 4/2019 | Hatakeyama | |
| 2020/0154067 A1 | 5/2020 | Igarashi et al. | G06T 2207/30252 |
| 2021/0044766 A1 | 2/2021 | Shikina et al. | H04N 5/379 |
| 2021/0067717 A1 | 3/2021 | Shigiya et al. | H04N 5/3456 |
| 2021/0176421 A1 | 6/2021 | Shikina et al. | H04N 5/357 |

FOREIGN PATENT DOCUMENTS

| | | |
|---|---|---|
| JP | 2019-47267 A | 3/2019 |
| JP | 2019-68351 A | 4/2019 |

\* cited by examiner

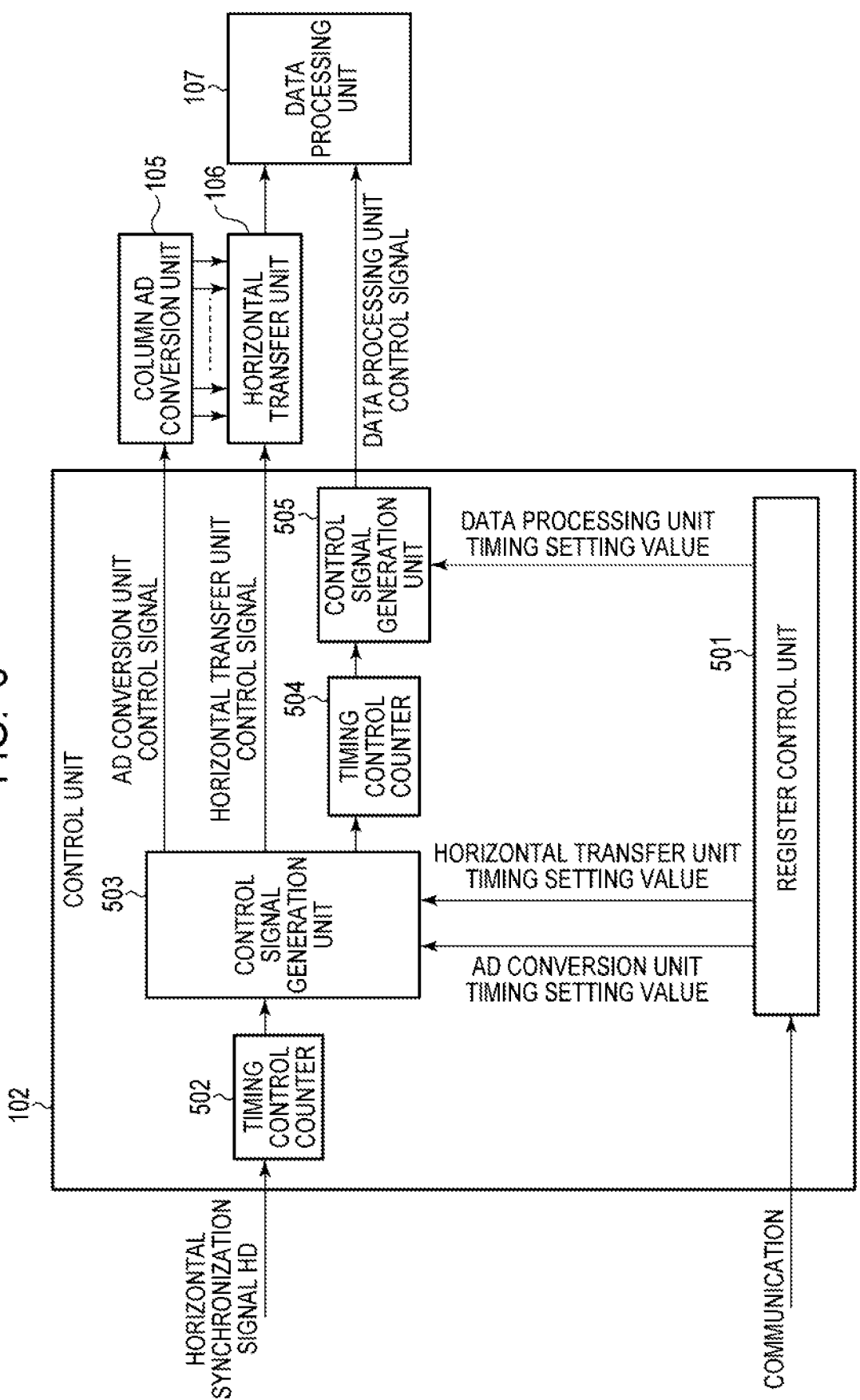

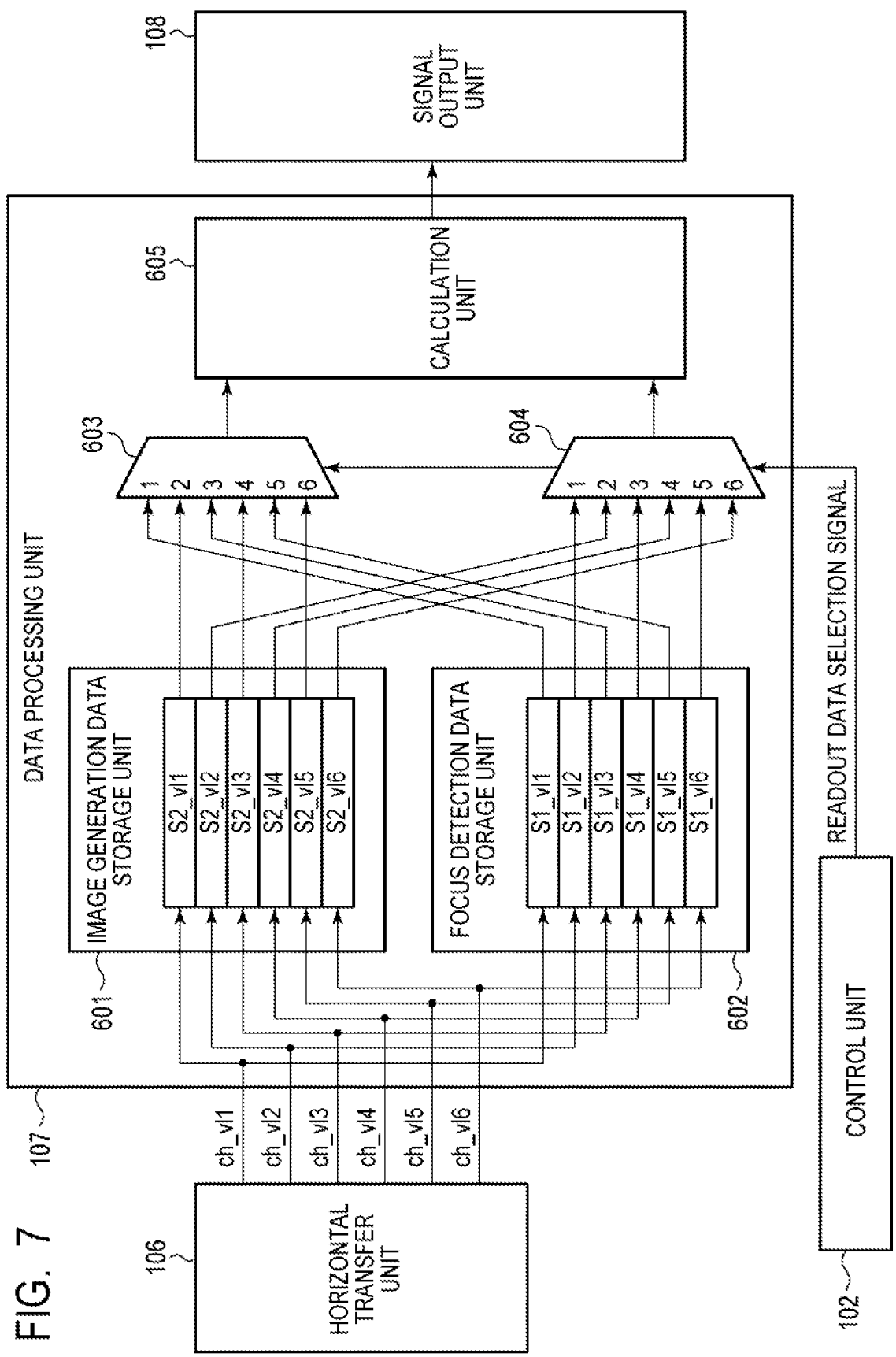

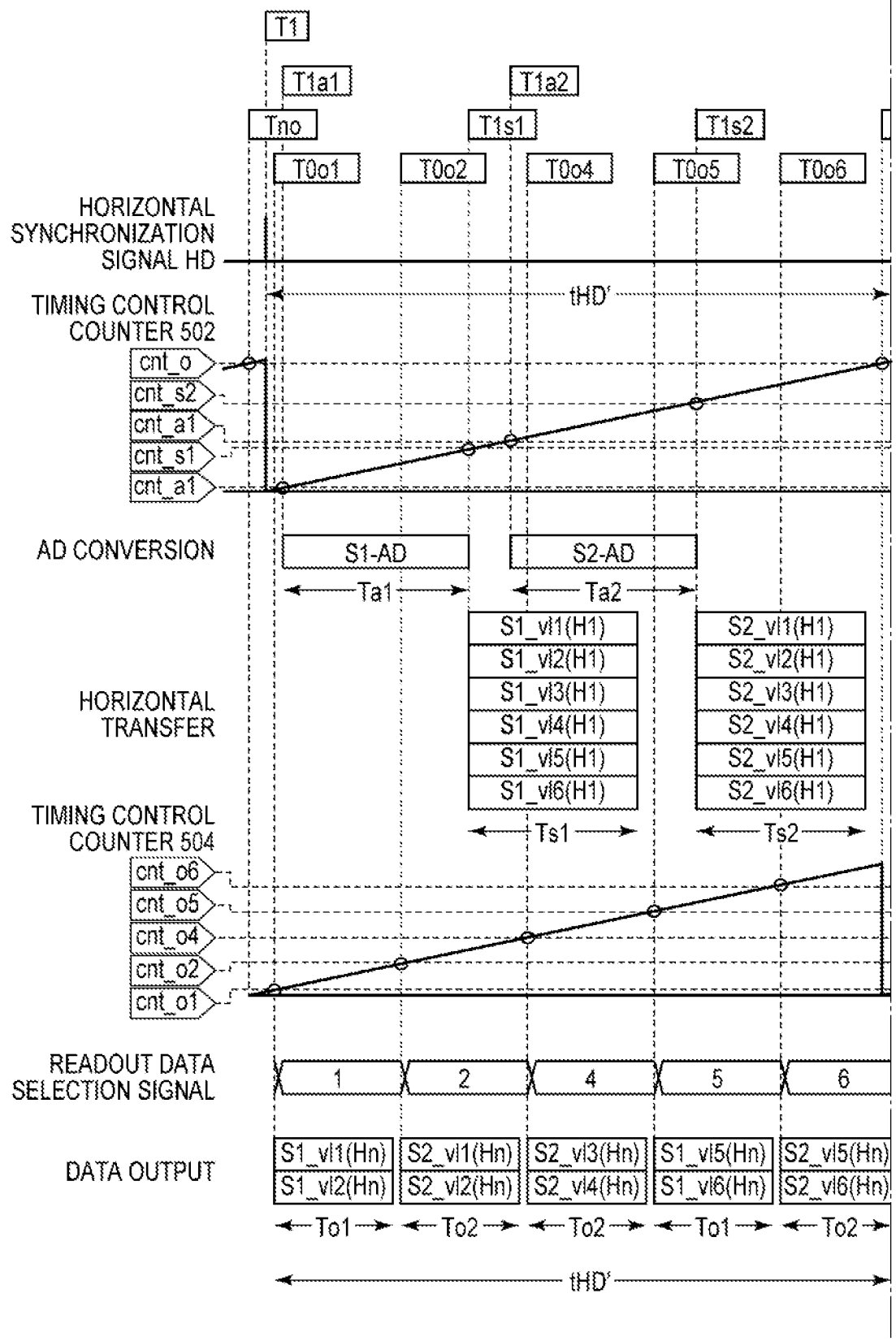

IMAGING DEVICE AND IMAGING SYSTEM

BACKGROUND OF THE INVENTION

Field of the Invention

The present invention relates to an imaging device and an imaging system.

Description of the Related Art

In imaging devices having a function of acquiring signals for image generation and signals for focus detection, there is a demand for faster image capturing. Japanese Patent Application Laid-open No. 2013-211833 proposes a scheme to achieve faster image capturing by selecting regions that output signals for focus detection to reduce the total number of acquired signals. Japanese Patent Application Laid-open No. 2019-047267 proposes a scheme to achieve both image quality and faster image capturing by switching whether or not to output signals used for focus detection accumulated in a memory in a unit of analog-to-digital (AD) conversion so as not to affect an accumulation time period or control of an analog circuit.

In general, a higher density of data acquisition regions used for focus detection improves AF performance. In the scheme of Japanese Patent Application Laid-open No. 2019-047267, however, since the density of data acquisition regions for AF depends on the number of rows on which AD conversion is simultaneously performed, an increase in the number of rows on which AD conversion is performed causes a decrease in the density of data acquisition regions for AF. In recent years, the number of rows on which AD conversion is simultaneously performed has increased in accordance with a demand for faster sensors, and there is a concern of deterioration of AF performance in the scheme in Japanese Patent Application Laid-open No. 2019-047267.

SUMMARY OF THE INVENTION

The object of the present invention is to provide an imaging device that can achieve both faster image capturing and AF performance without depending on the number of rows on which AD conversion is simultaneously performed.

According to one aspect of the present invention, provided is an imaging device including a plurality of pixels arranged to form a plurality of rows and a plurality of columns, each of the plurality of pixels including a first photoelectric converter and a second photoelectric converter, a plurality of output lines, wherein at least one of the plurality of output lines is arranged to each of the plurality of columns, and each of the plurality of output lines is connected to pixels on corresponding columns, an analog-to-digital (AD) conversion unit that includes a plurality of column AD conversion circuits each provided in association with the plurality of output lines, and converts analog signals output from each of the plurality of output lines into digital signals in parallel, a first storage unit that includes a plurality of holding units each provided in association with the plurality of column AD conversion circuits, and holds the digital signals generated by the AD conversion unit, a transfer unit that transfers the digital signals held in the first storage unit, a second storage unit that holds the digital signals transferred from the transfer unit, and an output unit that externally outputs the digital signals held in the second storage unit. Each of the plurality of pixels outputs a first analog signal based on a signal from the first photoelectric converter and a second analog signal based on a signal from the first photoelectric converter and the second photoelectric converter, the AD conversion unit is configured to convert each of the first analog signals into a first digital signal and convert each of the second analog signals into a second digital signal, and out of the digital signals output by the output unit, the number of signals corresponding to the first digital signals is less than the number of the first analog signals output in parallel from the plurality of output lines.

Further, according to another aspect of the present invention, provided is an imaging device including a plurality of pixels arranged to form a plurality of rows and a plurality of columns and including at least a first pixel and a second pixel, a plurality of output lines including at least a first output line connected to the first pixel and a second output line connected to the second pixel, an analog-to-digital (AD) conversion unit that includes at least a first AD conversion circuit provided in association with the first output line and a second AD conversion circuit provided in association with the second output line and converts an analog signal output from the first output line and an analog signal output from the second output line into a digital signal in parallel, a storage unit that holds the digital signal generated by the AD conversion unit; and a transfer unit that transfers the digital signal held in the storage unit. Each of the first pixel and the second pixel includes a first photoelectric converter and a second photoelectric converter, each of the first pixel and the second pixel outputs a first analog signal based on a signal from the first photoelectric converter and a second analog signal based on a signal from the first photoelectric converter and the second photoelectric converter, the storage unit holds a first digital signal converted from the first analog signal of the first pixel, a second digital signal converted from the second analog signal of the first pixel, a third digital signal converted from the first analog signal of the second pixel, and a fourth digital signal converted from the second analog signal of the second pixel, and the transfer unit transfers the second digital signal, the third digital signal, and the fourth digital signal but does not transfer the first digital signal.

Further features of the present invention will become apparent from the following description of exemplary embodiments with reference to the attached drawings.

BRIEF DESCRIPTION OF THE DRAWINGS

FIG. 6 is a schematic diagram illustrating a configuration example of a control unit in the imaging device according to the first embodiment of the present invention.

FIG. 7 is a schematic diagram illustrating a configuration example of a data processing unit in the imaging device according to the first embodiment of the present invention.

FIG. 9A and FIG. 9B are timing charts illustrating a method of driving the imaging device according to the first embodiment of the present invention (Part 2).

DESCRIPTION OF THE EMBODIMENTS

Preferred embodiments of the present invention will now be described in detail in accordance with the accompanying drawings.

First Embodiment

Figure 1:
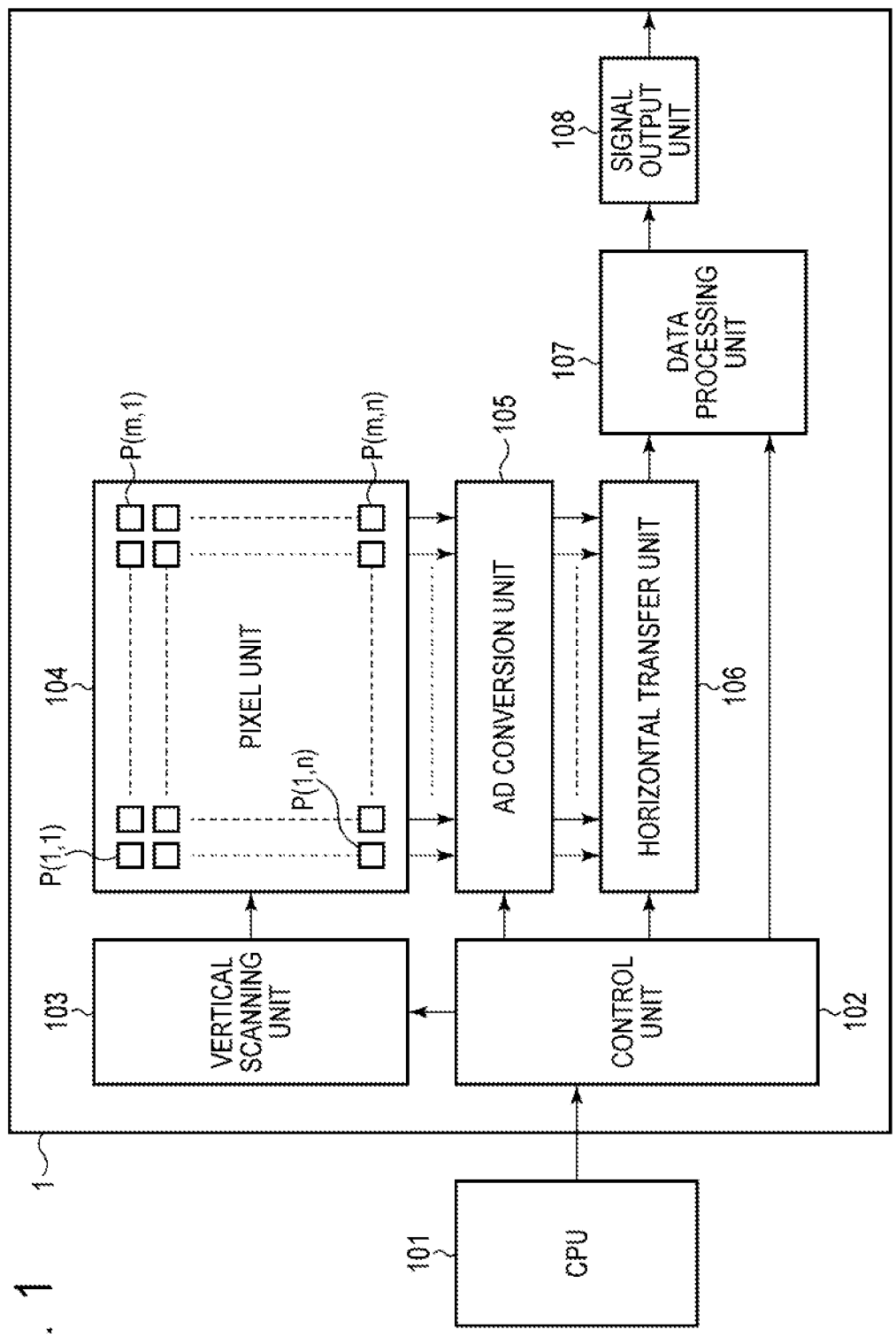
FIG. 1 is a block diagram illustrating a general configuration of an imaging device according to a first embodiment of the present invention.
Figure 2:
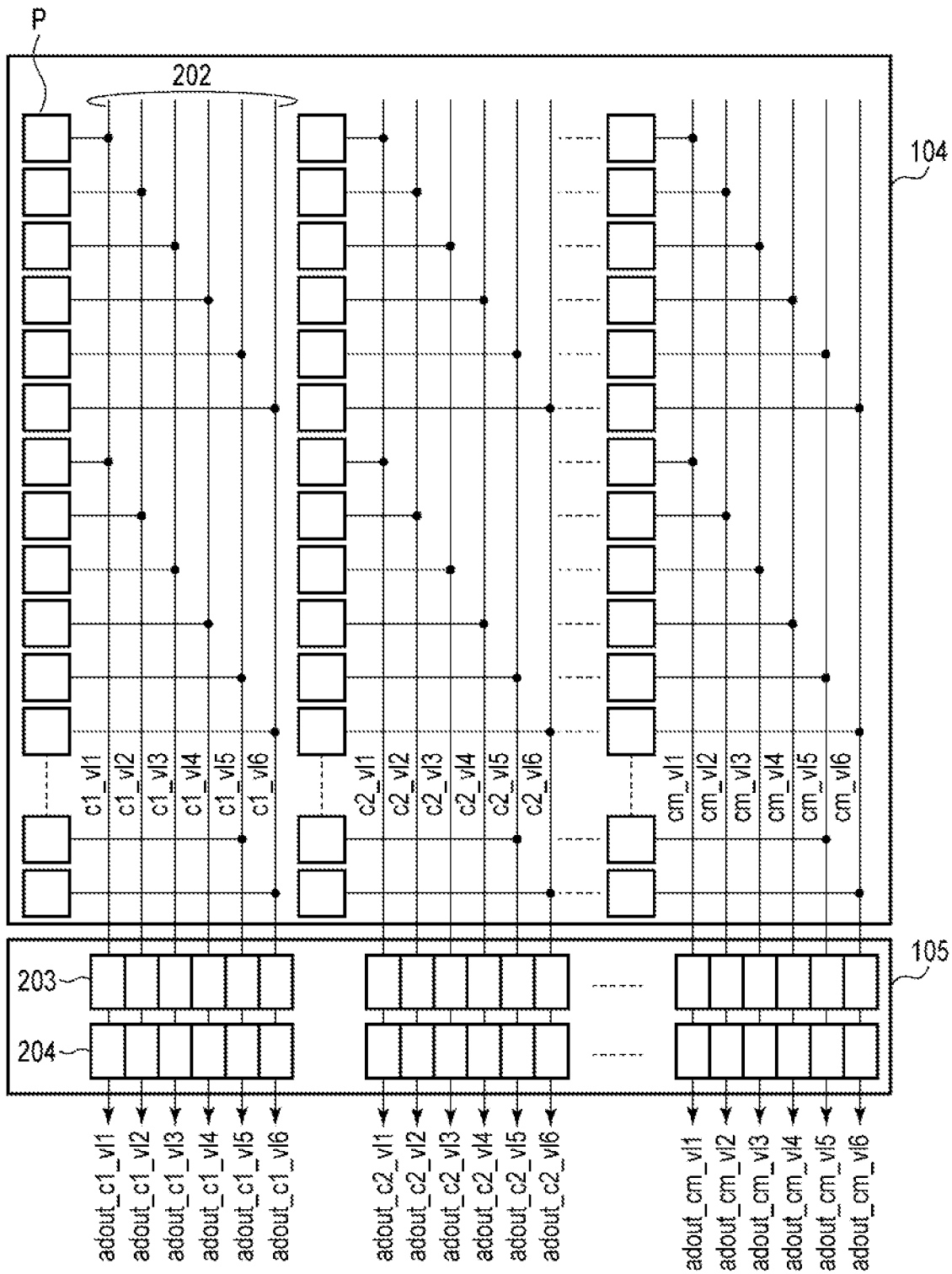
FIG. 2 is a schematic diagram illustrating a configuration example of a pixel unit and an AD conversion unit in the imaging device according to the first embodiment of the present invention.
Figure 3:
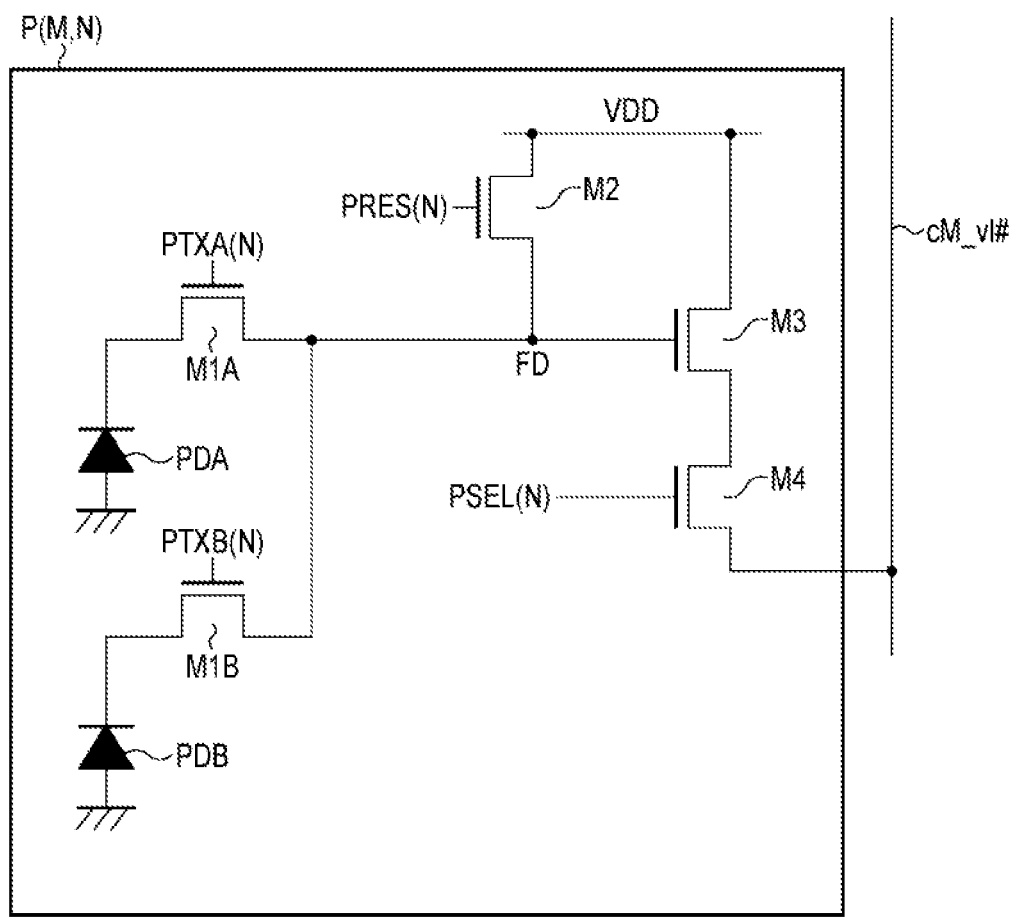
FIG. 3 is an equivalent circuit diagram illustrating a configuration example of a pixel in the imaging device according to the first embodiment of the present invention.
Figure 4:
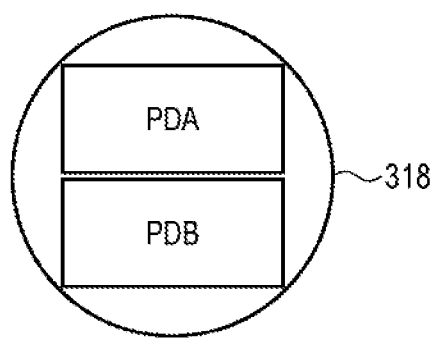
FIG. 4 is a schematic top view of a pixel in the imaging device according to the first embodiment of the present invention.
Figure 5:
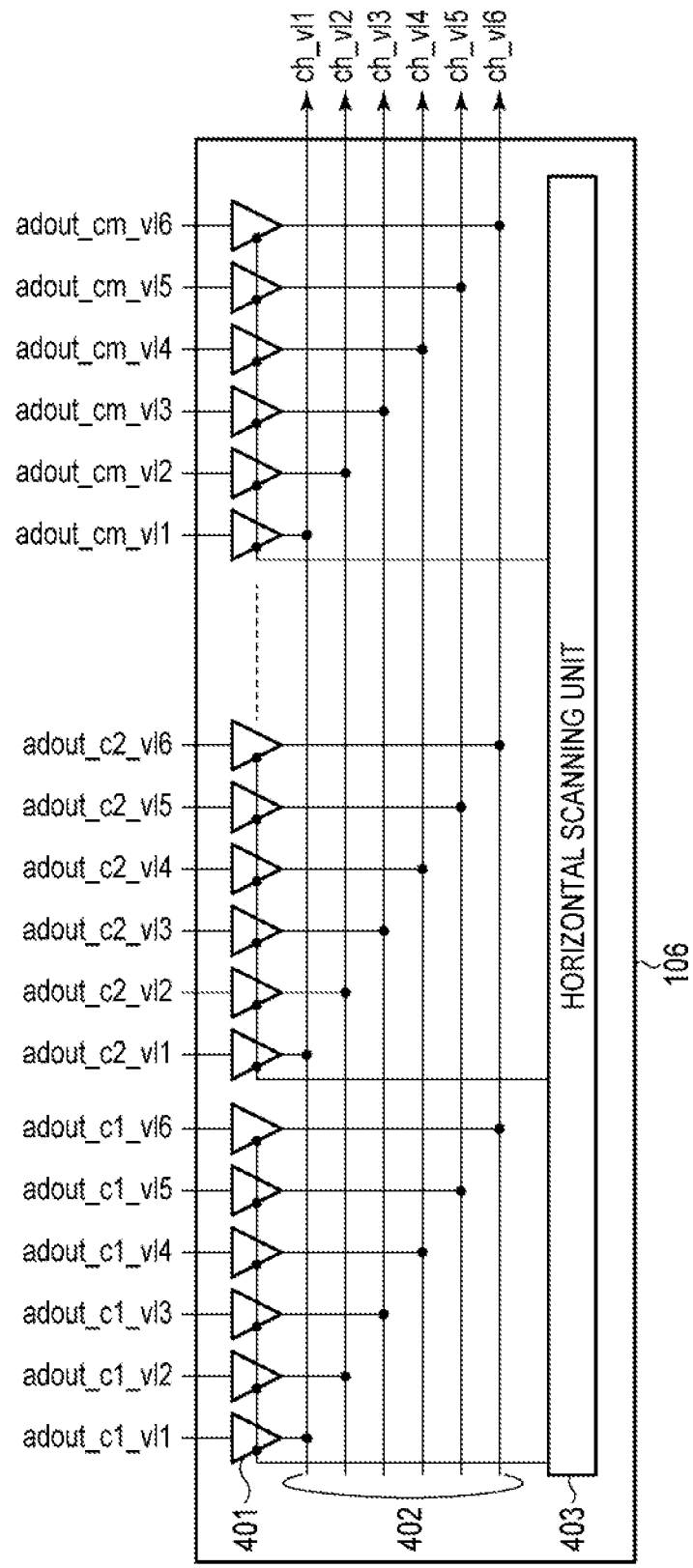
FIG. 5 is a schematic diagram illustrating a configuration example of a horizontal transfer unit in the imaging device according to the first embodiment of the present invention.

An imaging device according to a first embodiment of the present invention will be described with reference to FIG. 1 to FIG. 7. FIG. 1 is a block diagram illustrating a general configuration of the imaging device according to the present embodiment. FIG. 2 is a schematic diagram illustrating a configuration example of a pixel unit and an AD conversion unit in the imaging device according to the present embodiment. FIG. 3 is an equivalent circuit diagram illustrating a configuration example of a pixel in the imaging device according to the present embodiment. FIG. 4 is a schematic top view of a pixel in the imaging device according to the present embodiment. FIG. 5 is a schematic diagram illustrating a configuration example of a horizontal transfer unit in the imaging device according to the present embodiment. FIG. 6 is a schematic diagram illustrating a configuration example of a control unit in the imaging device according to the present embodiment. FIG. 7 is a schematic diagram illustrating a configuration example of a data processing unit in the imaging device according to the present embodiment.

As illustrated in FIG. 1, an imaging device 1 according to the present embodiment may be formed of a control unit 102, a vertical scanning unit 103, a pixel unit 104, an AD conversion unit 105, a horizontal transfer unit 106, a data processing unit 107, and a signal output unit 108. The vertical scanning unit 103 and the AD conversion unit 105 are connected to the pixel unit 104. The horizontal transfer unit 106 is connected to the AD conversion unit 105. The data processing unit 107 is connected to the horizontal transfer unit 106. The signal output unit 108 is connected to the data processing unit 107. The control unit 102 is connected to the vertical scanning unit 103, the AD conversion unit 105, the horizontal transfer unit 106, and the data processing unit 107. A CPU 101 of a different device from the imaging device 1 is connected to the control unit 102.

In the pixel unit 104, a plurality of pixels P each including a photoelectric converter is two-dimensionally arranged so as to form a plurality of rows and a plurality of columns. Each of the plurality of pixels P is configured to output a pixel signal in accordance with the amount of light entering the photoelectric converter. FIG. 1 illustrates the pixel unit 104 formed of the pixels P arranged in a matrix of m columns by n rows and provides coordinates denoted by (column number, row number) to the reference P of each pixel. Note that, in this specification, a direction in which each row extends (row direction) is defined as the horizontal direction, and a direction in which each column extends (column direction) is defined as the vertical direction.

The vertical scanning unit 103 is a control circuit unit that supplies control signals to the pixels P on a row basis via control lines (not illustrated) provided on respective rows of a pixel array, and the control signals are used for driving readout circuits in the pixels P when reading out signals from the pixels P. The vertical scanning unit 103 may be formed using a shift register or an address decoder.

The AD conversion unit 105 is a processing circuit unit that performs an analog-to-digital (AD) conversion process in column-parallel on pixel signals output via output lines (not illustrated) from the pixels P of the pixel unit 104.

The horizontal transfer unit 106 is a control circuit unit that transfers pixel signals converted into digital data in the AD conversion unit 105 to the data processing unit 107 sequentially on a column basis. The horizontal transfer unit 106 may be formed using a shift register or an address decoder.

The data processing unit 107 is a processing circuit unit that performs a predetermined process, for example, a digital correlated double sampling (CDS) process or an amplification process on digital data transferred from the horizontal transfer unit 106.

The signal output unit 108 is an output circuit that outputs digital data transferred from the data processing unit 107 to the external of the imaging device 1 as a signal conforming to a desired protocol. The signal output unit 108 may include an external interface such as a Low Voltage Differential Signaling (LVDS) or the like, for example.

The control unit 102 is a control circuit unit that, in response to receiving a synchronization signal or communication from the CPU 101, supplies control signals to the vertical scanning unit 103, the AD conversion unit 105, the horizontal transfer unit 106, and the data processing unit 107, and the control signals are used for controlling the operations of these units and the timings thereof.

As illustrated in FIG. 2, for example, a vertical output line 202 arranged extending in the column direction is provided on each column of the pixel unit 104. The vertical output line 202 on each column includes a predetermined number of signal lines. Although FIG. 2 illustrates an example of a case where the vertical output line 202 on each column includes six signal lines, the number of signal lines included in the vertical output line 202 on each column is not particularly limited. Further, in FIG. 2, signal lines forming the vertical output line 202 are distinguished by references denoted as cM_vl #. Herein, M denotes a column number, and # denotes a number of 1 to 6 corresponding to six signal lines on each column. For example, the signal lines connected to the pixel P on the first column are signal lines c1_vl1 to c1_vl6. Further, the signal lines connected to the pixel P on the m-th column are signal lines cm_vl1 to cm_vl6.

Each pixel P arranged on each column is connected to any one of the signal lines cM_vl # arranged on the column. In FIG. 2, the signal lines cM_vl # to which the pixels P are connected are defined periodically on a six-row basis in association with the number of signal lines cM_vl # arranged on each column. For example, the pixel P arranged on the first column on the first row is connected to the signal line c1_vl1. Further, the pixel P arranged on the second column on the fifth row is connected to the signal line c2_vl5. Further, the pixel P arranged on the m-th column on the ninth row is connected to the signal line cm_vl3. Note that each of the signal lines cM_vl # is connected to the AD conversion unit 105 and connected to a constant current source (not illustrated).

The AD conversion unit 105 includes column AD converters 203 and holding units 204 on each column, and the number of column AD converters 203 and the number of holding units 204 are each corresponding to the number of signal lines cM_vl # forming the vertical output line 202, as illustrated in FIG. 2, for example. In the example of FIG. 2, six column AD converters 203 and six holding units 204 are arranged on each column in association with six signal lines cM_vl # forming the vertical output line 202 on each column. The column AD converter 203 is connected to each of the signal lines cM_vl #. Further, the holding unit 204 is connected to each of the column AD converters 203.

The column AD converter 203 is a column AD conversion circuit that performs AD conversion on a pixel signal that is an analog signal output from the pixel P via the signal line cM_vl # and outputs digital data of the pixel signal to the holding unit 204. The plurality of column AD converters 203 forming the AD conversion unit 105 converts analog signals output from respective signal lines forming the vertical output lines 202 into digital signals in parallel. The holding unit 204 is a storage unit that holds digital data generated by the column AD converter 203 on a bit basis. The holding unit 204 transfers held digital data to the data processing unit 107 in accordance with a control signal from the horizontal transfer unit 106. In FIG. 2, digital data digitally converted from a pixel signal output from the signal line cM_vl # is denoted as adout_cM_vl #. The digital data adout_cM_vl # is a multiple-bit output signal.

As illustrated in FIG. 3, for example, each of the pixels P may be formed of photoelectric converters PDA and PDB, transfer transistors M1A and M1B, a reset transistor M2, an amplifier transistor M3, and a select transistor M4.

Each of the photoelectric converters PDA and PDB may be formed of a photoelectric conversion element such as a photodiode or a photogate, for example. In this example, a case where the photoelectric converters PDA and PDB are formed of photodiodes is assumed. The photodiode forming the photoelectric converter PDA has an anode connected to the ground node and a cathode connected to the source of the transfer transistor M1A. The photodiode forming the photoelectric converter PDB has an anode connected to the ground node and a cathode connected to the source of the transfer transistor M1B. The drain of the transfer transistor M1A and the drain of the transfer transistor M1B are connected to the source of the reset transistor M2 and the gate of the amplifier transistor M3. The connection node of the drain of the transfer transistor M1A, the drain of the transfer transistor M1B, the source of the reset transistor M2, and the gate of the amplifier transistor M3 is a floating diffusion portion FD. The drain of the reset transistor M2 and the drain of the amplifier transistor M3 are connected to a power supply voltage node (voltage VDD). The source of the amplifier transistor M3 is connected to the drain of the select transistor M4. The source of the select transistor M4 is connected to the signal line cM_vl #.

In the case of the pixel configuration illustrated in FIG. 3, the control line on each row arranged from the vertical scanning unit 103 to the pixel unit 104 includes a transfer gate signal line connected to the gate of the transfer transistor M1A and a transfer gate signal line connected to the gate of the transfer transistor M1B. Further, the control line on each row further includes a reset signal line connected to the gate of the reset transistor M2 and a select signal line connected to the gate of the select transistor M4.

Control signals PTXA(N), PTXB(N), PRES(N), and PSEL(N) are supplied from the vertical scanning unit 103 to the pixels P arranged on the N-th row. The control signal PTXA(N) is a control signal supplied to the gates of the transfer transistors M1A of the pixels P on the N-th row. The control signal PTXB(N) is a control signal supplied to the gates of the transfer transistors M1B of the pixels P on the N-th row. The control signal PRES(N) is a control signal supplied to the gates of the reset transistors M2 of the pixels P on the N-th row. The control signal PSEL(N) is a control signal supplied to the gates of the select transistors M4 of the pixels P on the N-th row. A common control signals are supplied to the pixels P on the same row from the vertical scanning unit 103. When each transistor is formed of an n-channel transistor, a corresponding transistor is turned on when a high-level control signal is supplied from the vertical scanning unit 103, and a corresponding transistor is turned off when a low-level control signal is supplied from the vertical scanning unit 103.

Each of the photoelectric converters PDA and PDB converts (photoelectrically converts) incident light into an amount of charge in accordance with the light amount and accumulates the generated charge. When turned on, the transfer transistor M1A transfers the charge held by the photoelectric converter PDA to the floating diffusion portion FD. When turned on, the transfer transistor M1B transfers the charge held by the photoelectric converter PDB to the floating diffusion portion FD. The floating diffusion portion FD has a capacitance component, and holds the charge transferred from the photoelectric converters PDA and/or PDB and sets potential of the floating diffusion portion FD to a potential in accordance with the amount of the charge by charge-voltage conversion caused by the capacitance component. The amplifier transistor M3 is configured such that the power supply voltage is supplied to the drain and bias current is supplied to the source from a current source (not illustrated) via the signal line cM_vl # and the select transistor M4 and forms a source follower circuit (amplifier unit) whose gate is the input node. Accordingly, the amplifier transistor M3 outputs a signal based on the potential of the floating diffusion portion FD to the signal line cM_vl # via the select transistor M4. When turned on, the reset transistor M2 resets the floating diffusion portion FD to a potential in accordance with the power supply voltage. The select transistor M4 switches the connection between the amplifier transistor M3 and the signal line cM_vl #.

Further, the photoelectric converter PDA and the photoelectric converter PDB forming a single pixel P share a single micro lens 318, as illustrated in FIG. 4, for example. In other words, the photoelectric converter PDA and the photoelectric converter PDB are configured to receive portions of light that have passed through different pupil regions of light that has entered an imaging optical system. With such a configuration, a signal based on charge generated by the photoelectric converter PDA and a signal based on charge generated by the photoelectric converter PDB may be used as signals for phase difference detection.

As illustrated in FIG. 5, for example, the horizontal transfer unit 106 may be formed of a plurality of three-state buffers 401, a horizontal transfer line 402, and a horizontal scanning unit 403.

The plurality of three-state buffers 401 is provided in association with the plurality of holding units 204 of the AD conversion unit 105. Each of the plurality of three-state buffers 401 has an input node, an output node, and a gate node. The input node of the three-state buffer 401 is connected to a corresponding holding unit 204.

The plurality of three-state buffers 401 forms a group on a column basis. A common control signal from the horizontal scanning unit 403 is supplied to the gate nodes of the three-state buffers 401 included in one group. In the example of FIG. 5, six three-state buffers 401 corresponding to the number of signal lines cM_vl #, column AD converters 203, or holding units 204 corresponding to one column form one group.

The horizontal transfer line 402 is formed of a plurality of signal lines corresponding to the number of signal lines cM_vl #, column AD converters 203, holding units 204, or three-state buffers 401 corresponding to one column. The output nodes of the three-state buffers 401 forming one group are connected to signal lines that are different from each other. In the example of FIG. 5, the horizontal transfer line 402 is formed of six signal lines corresponding to the number of signal lines cM_vl #, column AD converters 203, holding units 204, or three-state buffers 401 corresponding to one column.

The three-state buffer 401 can select "outputting an input signal as it stands" or "outputting no signal (high impedance state)" in accordance with a control signal supplied to the gate node.

In such a way, in the present embodiment, the horizontal transfer line 402 is formed of signal lines of six channels in association with the number of signal lines cM_vl #, column AD converters 203, or holding units 204 corresponding to one column. Thereby, digital data adout_cM_vl1 is output as data ch_vl1 from a signal line of the horizontal transfer line 402 via the three-state buffer 401. Further, digital data adout_cM_vl2 is output as data ch_vl2 from a signal line of the horizontal transfer line 402 via the three-state buffer 401. The same applies to digital data adout_cM_vl3, adout_cM_vl4, adout_cM_vl5, and adout_cM_vl6.

As illustrated in FIG. 6, for example, the control unit 102 may be formed of a register control unit 501, timing control counters 502 and 504, and control signal generation units 503 and 505. The register control unit 501 is connected to the CPU 101 and the control signal generation units 503 and 505. The timing control counter 502 is connected to the CPU 101 and the control signal generation unit 503. The control signal generation unit 503 is connected to the timing control counter 504. The timing control counter 504 is connected to the control signal generation unit 505.

The register control unit 501 holds various setting values set by communication with the CPU 101. The register control unit 501 outputs an AD conversion unit timing setting value and a horizontal transfer unit timing setting value to the control signal generation unit 503. Further, the register control unit 501 outputs a data processing unit timing setting value to the control signal generation unit 505.

The timing control counter 502 performs a count operation in response to a horizontal synchronization signal HD supplied from a timing signal generation unit as a trigger, which generates a timing signal by the CPU 101 or under the control of the CPU 101, and outputs a count value to the control signal generation unit 503.

The control signal generation unit 503 generates an AD conversion unit control signal based on the AD conversion unit timing setting value and the count value supplied from the timing control counter 502 as references and supplies the AD conversion unit control signal to the AD conversion unit 105. Further, the control signal generation unit 503 generates a horizontal transfer unit control signal based on the horizontal transfer unit timing setting value and the count value supplied from the timing control counter 502 as references and supplies the horizontal transfer unit control signal to the horizontal transfer unit 106.

The timing control counter 504 performs a count operation in response to a timing generated based on the count value supplied front the timing control counter 502 as a trigger and outputs a count value to the control signal generation unit 505.

The control signal generation unit 505 generates a data processing unit control signal based on a data processing unit timing setting value and the count value supplied from the timing control counter 504 as references and supplies the data processing unit control signal to the data processing unit 107. The data processing unit control signal includes a readout data selection signal. The readout data selection signal is switched at a timing when the count value supplied from the timing control counter 504 becomes a setting value ent op (p is an integer that is one or greater and six or less) and is used for selecting data to be read out. The value of a readout data selection signal is allocated to respective different values for the setting values cnt_o1, cnt_o2, cnt_o3, cnt_o4, cnt_o5, and cnt_o6 of the data processing unit 107. In the present embodiment, 1 is allocated to the setting value cnt_o1, 2 is allocated to the setting value cnt_o2, 3 is allocated to the setting value cnt_o3, 4 is allocated to the setting value cnt_o4, 5 is allocated to the setting value cnt_o5, and 6 is allocated to the setting value cnt_o6.

As illustrated in FIG. 7, for example, the data processing unit 107 may be formed of an image generation data storage unit 601, a focus detection data storage unit 602, readout row selection units 603 and 604, and a calculation unit 605.

The image generation data storage unit 601 includes holding units S2_vl1 to S2_vl6, the number of which corresponds to the number of rows on which AD conversion is simultaneously performed. The focus detection data storage unit 602 includes holding units S1_vl1 to S1_vl6, the number of which corresponds to the number of rows on which AD conversion is simultaneously performed. The holding units S2_vl1, S2_vl3, and S2_vl5 of the image generation data storage unit 601 and the holding units S1_vl1, S1_vl3, and S1_vl5 of the focus detection data storage unit 602 are connected to the readout row selection unit 603. The holding units S2_vl2, S2_vl4, and S2_vl6 of the image generation data storage unit 601 and the holding units S1_vl2, S1_vl4, and S1_vl6 of the focus detection data storage unit 602 are connected to the readout row selection unit 604. The readout row selection unit 603 and the readout row selection unit 604 are connected to the calculation unit 605. The calculation unit 605 is connected to the signal output unit 108. A readout data selection signal is supplied from the control unit 102 to the readout row selection unit 603 and the readout row selection unit 604.

Data ch_vl1 to ch_vl6 output from the horizontal transfer unit 106 via the horizontal transfer line 402 are supplied to each of the image generation data storage unit 601 and the focus detection data storage unit 602. Data ch_vl1 to ch_vl6 supplied to the image generation data storage unit 601 are stored in the holding units S2_vl1 to S2_vl6 of the image generation data storage unit 601, respectively. Data stored in the holding units S2_vl1 to S2_vl6 are data used for image generation (image generation data). Further, data ch_vl1 to ch_vl6 supplied to the focus detection data storage unit 602 are stored in the holding units S1_vl1 to S1_vl6 of the focus detection data storage unit 602, respectively. Data stored in the holding units S1_vl1 to S1_vl6 are data used for focus detection (focus detection data).

Image generation data read out from the holding units S2_vl1, S2_vl3, and S2_vl5 and focus detection data read out from the holding units S1_vl1, S1_vl3, and S1_vl5 are input to the readout row selection unit 603. The readout row selection unit 603 selects any one of these input data in accordance with a readout data selection signal and outputs the selected one to the calculation unit 605.

Image generation data read out from the holding units S2_vl2, S2_vl4, and S2_vl6 and focus detection data read out from the holding units S1_vl2, S1_vl4, and S1_vl6 are input to the readout row selection unit 604. The readout row selection unit 604 selects any one of these input data in accordance with a readout data selection signal and outputs the selected one to the calculation unit 605.

A readout data selection signal supplied to the readout row selection unit 603 and a readout data selection signal supplied to the readout row selection unit 604 are the some. Therefore, when the readout data selection signal is 1, data held in the holding unit S1_vl1 and the holding unit S1_vl2 are selected. When the readout data selection signal is 2, data held in the holding unit S2_vl1 and the holding unit S2_vl2 are selected. When the readout data selection signal is 3, data held in the holding unit S1_vl3 and the holding unit S1_vl4 are selected. When the readout data selection signal is 4, data held in the holding unit S2_vl3 and the holding unit S2_vl4 are selected. When the readout data selection signal is 5, data held in the holding unit S1_vl5 and the holding unit S1_vl6 are selected. When the readout data selection signal is 6, data held in the holding unit S2_vl5 and the holding unit S2_vl6 are selected.

Data selected by the readout row selection units 603 and 604 are supplied to the calculation unit 605. The calculation unit 605 performs a calculation process such as black level correction on each input data and outputs the processed data to the signal output unit 108.

In such a way, the data processing unit 107 in the present embodiment selects and reads out, sequentially in a unit of two rows, six rows of image generation data that have been simultaneously digitally converted and horizontally transferred and six rows of focus detection data that have been simultaneously digitally converted and horizontally transferred and outputs the readout data after performing calculation processing thereon. With the two readout row selection units of the readout row selection units 603 and 604 being provided, it is possible to read out two rows of data simultaneously and perform data processing thereon.

Next, a method of driving the imaging device according to the present embodiment will be described with reference to FIG. 8A to 10B. FIG. 8A-FIG. 8B, FIG. 9A-FIG. 9B, and FIG. 10A-FIG. 10B are timing charts illustrating the method of driving the imaging device according to the present embodiment.

Figure 8A:
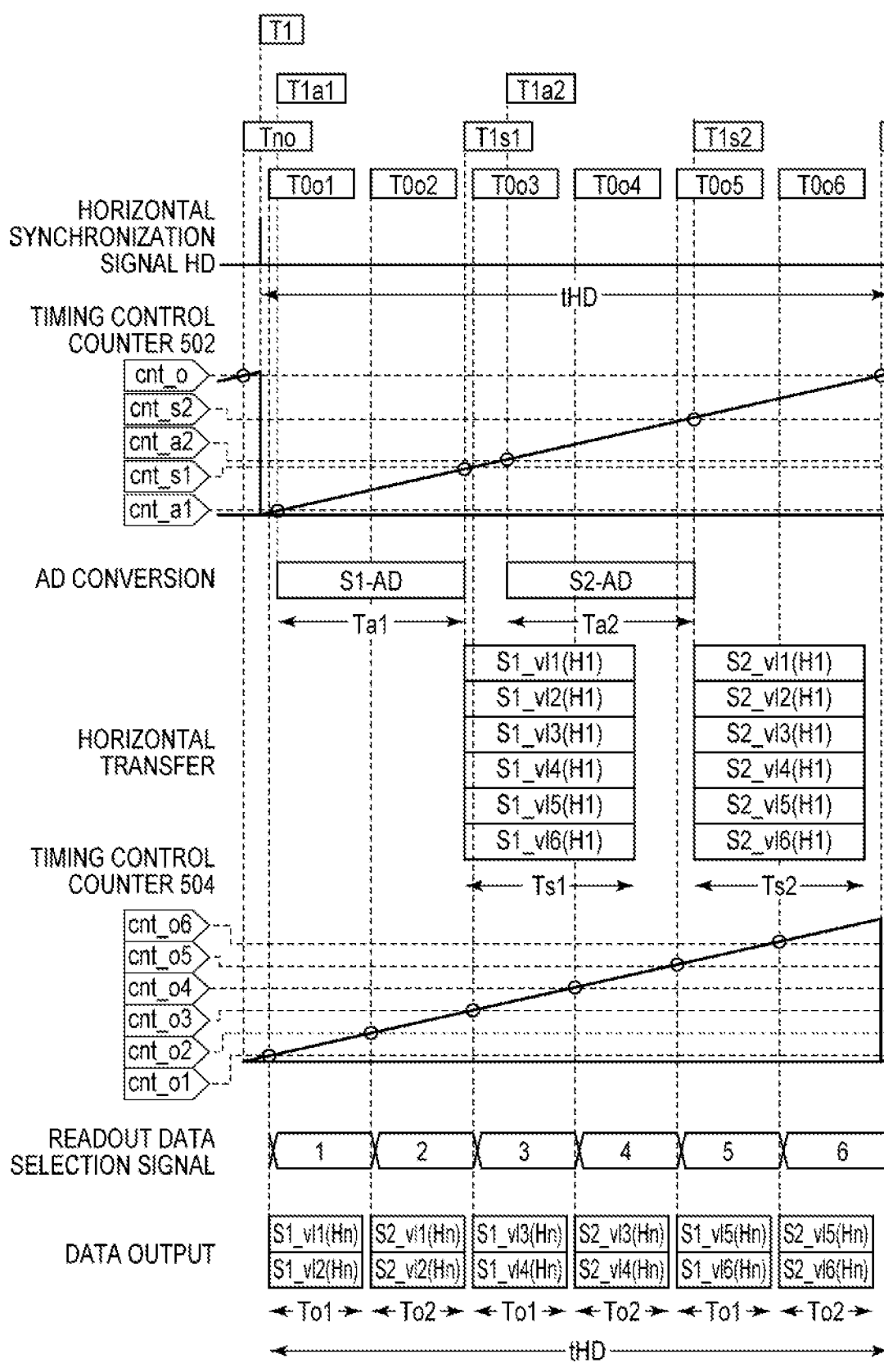
FIG. 8A and FIG. 8B are timing charts illustrating a method of driving the imaging device according to the first embodiment of the present invention (Part 1).
Figure 8B:
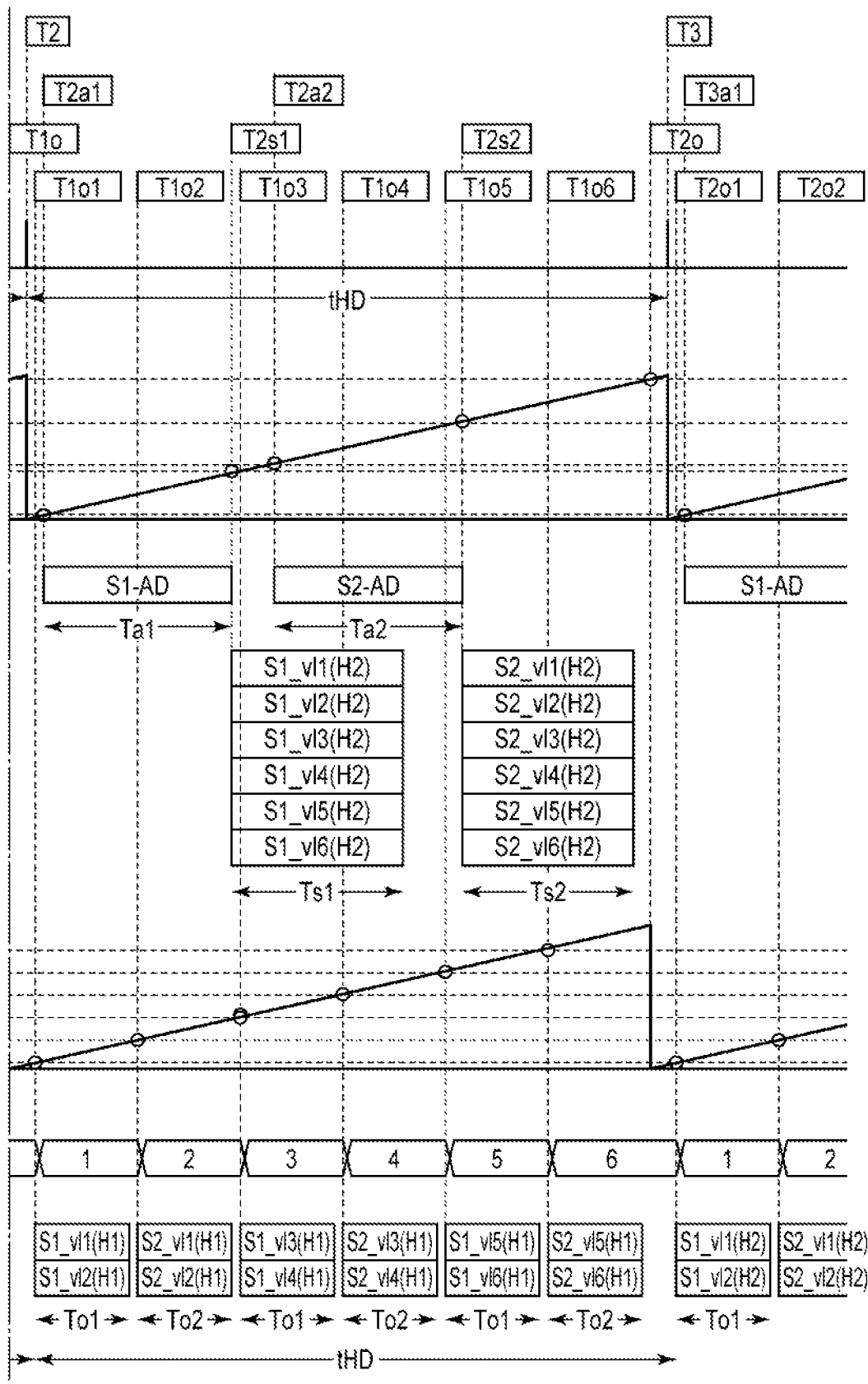

FIG. 8A and FIG. 8B illustrate a drive example of the AD conversion unit 105, the horizontal transfer unit 106, the data processing unit 107, and the signal output unit 108. This drive example is to perform AD conversion simultaneously on six rows of pixel signals and outputs signals sequentially in a unit of two rows by one pixel by one pixel. Note that, when the number of output lines arranged on each column is a first number, and the number of rows of data output in parallel by the signal output unit 108 is a second number, the first number is an integral multiple of the second number.

First, an operation of performing AD conversion on pixel signals of the pixels P from the first row to the sixth row and writing the data to a storage unit in the data processing unit 107 will be described.

At time T1, the imaging device 1 receives the horizontal synchronization signal HD from the external CPU 101. The control unit 102 resets the count value of the timing control counter 502 to the initial value (for example, 0) in response to the horizontal synchronization signal HD. The count value of the timing control counter 502 is used for managing timings from AD conversion of a pixel signal to storage of data in the image generation data storage unit 601 and the focus detection data storage unit 602 of the data processing unit 107. Time T1 is the timing of start of a horizontal period 141.

Next, at time T1a1 when the count value of the timing control counter 502 becomes a setting value cnt_a1, the column AD converter 203 starts AD conversion simultaneously on the focus detection data S1 of the pixels P on all the columns from the first row to the sixth row. Herein, the time required for AD conversion of these data is Ta1.

Next, at time T1s1 after the time of completion of the AD conversion on the focus detection data S1 (time after the period Ta1 has elapsed from the time T1a1), digital data digitally converted from the focus detection data S1 are collectively transferred to the holding units 204. Herein, a generated group of data on the first row is referred to as S1_vl1(H1), a group of data on the second row is referred to as S1_vl2(H1), and a group of data on the third row is referred to as S1_vl3(H1). Further, a group of data on the fourth row is referred to as S1_vl4(H1), a group of data on the fifth row is referred to as S1_vl5(H1), and a group of data on the sixth row is referred to as S1_vl6(H1).

After time T1s1, the group of data S1_vl #(H1) (herein, # is an integer from 1 to 6) held by the holding units 204 are transferred to the data processing unit 107 via the horizontal transfer unit 106 in a unit of six rows by one pixel by one pixel. The data transferred to the data processing unit 107 are written to the focus detection data storage unit 602. Herein, the time required for transfer of these data is Ts1.

Next, at time T1a2 when the count value of the timing control counter 502 becomes a setting value cnt_a2, the column AD converters 203 simultaneously start AD conversion on the image generation data S2 of the pixels P on all the columns from the first row to the sixth row. Herein, the time required for AD conversion of these data is Ta2.

Next, at time T1s2 after the time of completion of the AD conversion of the image generation data S2 (time after the period Ta2 has elapsed from the time T1a2), digital data digitally converted from the image generation data S2 are collectively transferred to the holding units 204. Herein, a generated group of data on the first row is referred to as S2_vl1(H1), a group of data on the second row is referred to as S2_vl2(H1), and a group of data on the third row is referred to as S2_vl3(H1). Further, a group of data on the fourth row is referred to as S2_vl4(H1), a group of data on the fifth row is referred to as S2_vl5(H1), and a group of data on the sixth row is referred to as S2_vl6(H1).

After time T1s2, the group of data S2_vl #(H1) (herein, # is an integer from 1 to 6) held by the holding units 204 are transferred to the data processing unit 107 via the horizontal transfer unit 106 in a unit of six rows by one pixel by one pixel. The data transferred to the data processing unit 107 are written to the image generation data storage unit 601. Herein, the time required for transfer of these data is Ts2.

At subsequent time T1o, it is assumed that the count value of the timing control counter 502 reaches a setting value ent_o. In response to the count value of the timing control counter 502 reaching the setting value cnt_o, the control unit 102 resets the count value of the timing control counter 504 to the initial value. The timing control counter 504 then starts count-up. The timing control counter 504 is used for managing timings from readout of data stored in the image generation data storage unit 601 and the focus detection data storage unit 602 of the data processing unit 107 to output of the data to the signal output unit 108.

At subsequent time T1o1, it is assumed that the count value of the timing control counter 504 reaches a setting value cnt_o1. In response to the count value of the timing control counter 504 reaching the setting value cnt_o1, the control signal generation unit 505 sets a readout data selection signal to 1 that is the value allocated to the setting value cnt_o1. Similarly, when the count value of the timing control counter 504 reaches the setting value cnt_o2, the control signal generation unit 505 sets a readout data selection signal to 2 that is the value allocated to the setting value cnt_o2. Further, when the count value of the timing control counter 504 reaches the setting value cnt_o3, the control signal generation unit 505 sets a readout data selection signal to 3 that is the value allocated to the setting value cnt_o3. Further, when the count value of the timing control counter 504 reaches the setting value cnt_o4, the control signal generation unit 505 sets a readout data selection signal to 4 that is the value allocated to the setting value cnt_o4. Further, when the count value of the timing control counter 504 reaches the setting value cnt_o5, the control signal generation unit 505 sets a readout data selection signal to 5 that is the value allocated to the setting value cnt_o5. Further, when the count value of the timing control counter 504 reaches the setting value cnt_o6, the control signal generation unit 505 sets a readout data selection signal to 6 that is the value allocated to the setting value cnt_o6.

The data processing unit 107 selects data of corresponding two rows from the image generation data storage unit 601 or the focus detection data storage unit 602 in response to a readout data selection signal supplied from the control unit 102 and starts readout. There is no restriction in the level relationship of the setting values cnt_o1, cnt_o2, cnt_o3, cnt_o4, cnt_o5, and cnt_o6, and the data processing unit 107 reads out image generation data and focus detection data in arbitrary order and timing. Each readout data is subjected to data processing in the calculation unit 605 and output from the signal output unit 108. Herein, the time required for readout of focus detection data is To1, and the time required for readout of image generation data is To2.

At subsequent time T2o, it is assumed that the count value of the timing control counter 502 reaches a setting value cnt_o. In response to the count value of the timing control counter 502 reaching the setting value cnt_o, the control unit 102 resets the count value of the timing control counter 504 to the initial value again.

In the period from time T1o to time T2o, if the setting value cnt_op (p is an integer that is one or greater and six or less) is a value that cannot be taken by the timing control counter 504, image generation data and focus detection data selected by the setting value cnt_op are not read out. Accordingly, some of the image generation data and the focus detection data for six rows on which AD conversion has been simultaneously performed are not output.

The period required for outputting data is expressed as follows. Herein, n denotes the number of readout rows of focus detection data, and m denotes the number of readout rows of image generation data. This period is required to be less than or equal to tHD that is the length of one horizontal period.

$$To1 \times n/2 + To2 \times m/2$$

The timing charts of FIG. 8A and FIG. 8B represent a case where all of six rows of focus detection data and image generation data are output, which is expressed as the following equation.

$$To1 \times 3 + To2 \times 3 \leq tHD$$

As described above, data of the pixels P from the first row to the sixth row are digitally converted simultaneously for six rows, and two rows of data are output from the imaging device 1 by one pixel by one pixel.

Data of the pixels P from the seventh row to the twelfth row are processed in the same manner as the data of the pixels P from the first row to the sixth row based on the horizontal synchronization signal HD input at time T2. In the same way, the same process is repeatedly performed on a six-row basis, and data of the pixels P on all the rows are output. That is, data processed based on the horizontal synchronization signal HD input at time Tn (n is an integer greater than 0) are data of the pixels P from the ((n−1)×6+1)-th row to the (n×6)-th row.

Figure 9B:
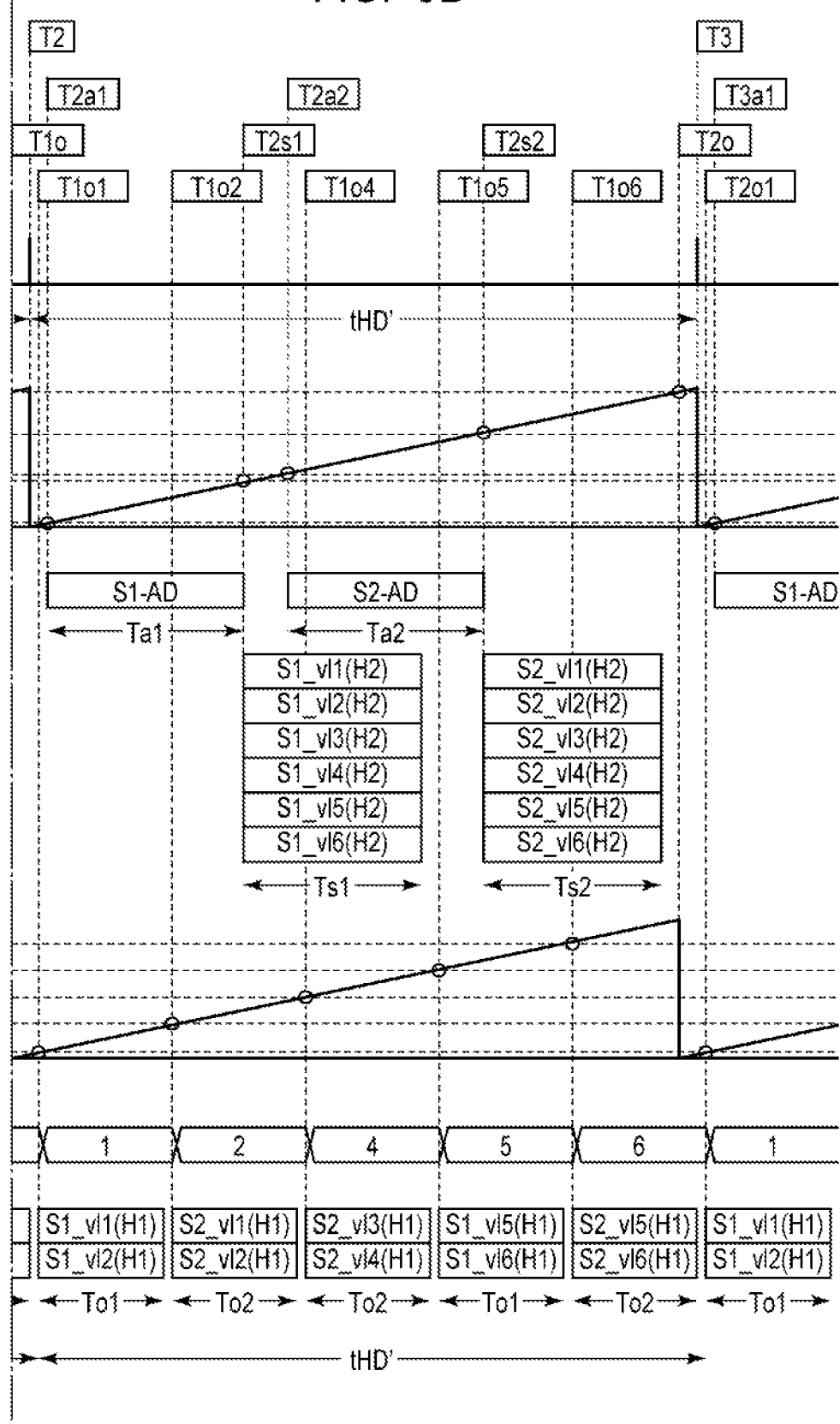

FIG. 9A and FIG. 9B illustrate another drive example of the AD conversion unit 105, the horizontal transfer unit 106, the data processing unit 107, and the signal output unit 108. This drive example is to output six rows of image generation data and output only four rows of focus detection data. In the following, differences from the drive example of FIG. 8A and FIG. 8B will be mainly described.

Since the operations from time T1 to time T1o, that is, the operations of performing AD conversion on data of the pixels P from the ((n−1)×6+1)-th row to the (n×6)-th row and writing the converted data to the data processing unit 107 are the same as those of the drive example of FIG. 8A and FIG. 8B, the description thereof will be omitted here.

At time T1o, six rows of image generation data corresponding to the pixels P from the first row to the sixth row are stored in the image generation data storage unit 601 of the data processing unit 107. Further, six rows of focus detection data corresponding to the pixels P from the first row to the sixth row are stored in the focus detection data storage unit 602 of the data processing unit 107.

In this drive example, the setting values cnt_o1, cnt_o2, cnt_o4, cnt_o5, and cnt_o6 are each set to a smaller value than the maximum value of the values that can be taken by the timing control counter 504. On the other hand, the setting value cnt_o3 is set to a larger value than the maximum value of the values that can be taken by the timing control counter 504.

At subsequent time T1o1, it is assumed that the count value of the timing control counter 504 reaches the setting value cnt_o1. In response to the count value of the timing control counter 504 reaching the setting value cnt_o1, the control signal generation unit 505 sets a readout data selection signal to 1 that is the value allocated to the setting value cnt_o1. Similarly, when the control value of the timing control counter 504 reaches the setting value cnt_o2, the control signal generation unit 505 sets a readout data selection signal to 2 that is the value allocated to the setting value cnt_o2. Further, when the count value of the timing control counter 504 reaches the setting value cnt_o4, the control signal generation unit 50S sets a readout data selection signal to 4 that is the value allocated to the setting value cnt_o4. Further, when the count value of the timing control counter 504 reaches the setting value cnt_o5, the control signal generation unit 505 sets a readout data selection signal to 5 that is the value allocated to the setting value cnt_o5. Further, when the count value of the timing control counter 504 reaches the setting value cnt_o6, the control signal generation unit 505 sets a readout data selection signal to 6 that is the value allocated to the setting value cnt_o6.

The data processing unit 107 selects data of corresponding two rows from the image generation data storage unit 601 or the focus detection data storage unit 602 in response to a readout data selection signal supplied from the control unit 102 and starts readout in the same manner as the drive example of FIG. 8A and FIG. 8B. Each readout data is subjected to data processing in the calculation unit 605 and output from the signal output unit 108. The number of signals corresponding to the focus detection data out of the signals output from the signal output unit 108 is less than the number of pixel signals output in parallel from the pixel unit 104.

In the drive example of FIG. 9A and FIG. 9B, since the count value of the timing control counter 504 does not become the value of the setting value cnt_o3, the readout data selection signal would not become 3 that is the value allocated to the setting value cnt_o3. That is, the data held in the holding units S1_vl3 and S1_vl4 of the focus detection data storage unit 602 corresponding to the readout data selection signal of 3 are not output. Therefore, out of six rows of focus detection data digitally converted simultaneously in one horizontal period, only four rows of the focus detection data are output, and two rows of the focus detection data are not output.

In the drive example of FIG. 9A and FIG. 9B, the period required for outputting data is (To1×2+To2×3). In the drive example of FIG. 9A and FIG. 9B, if the cycle of the horizontal synchronization signal HD is tHD', the period required for outputting data is expressed as follows.

$$To1 \times 2 + To2 \times 3 \leq tHD'$$

The cycle tHD' of the horizontal synchronization signal HD in the drive example of FIG. 9A and FIG. 9B is shorter than the cycle tHD of the horizontal synchronization signal HD in the drive example of FIG. 8A and FIG. 8B, and one horizontal period can be shorter than that in the drive example of FIG. 8A and FIG. 81.

Figure 10A:
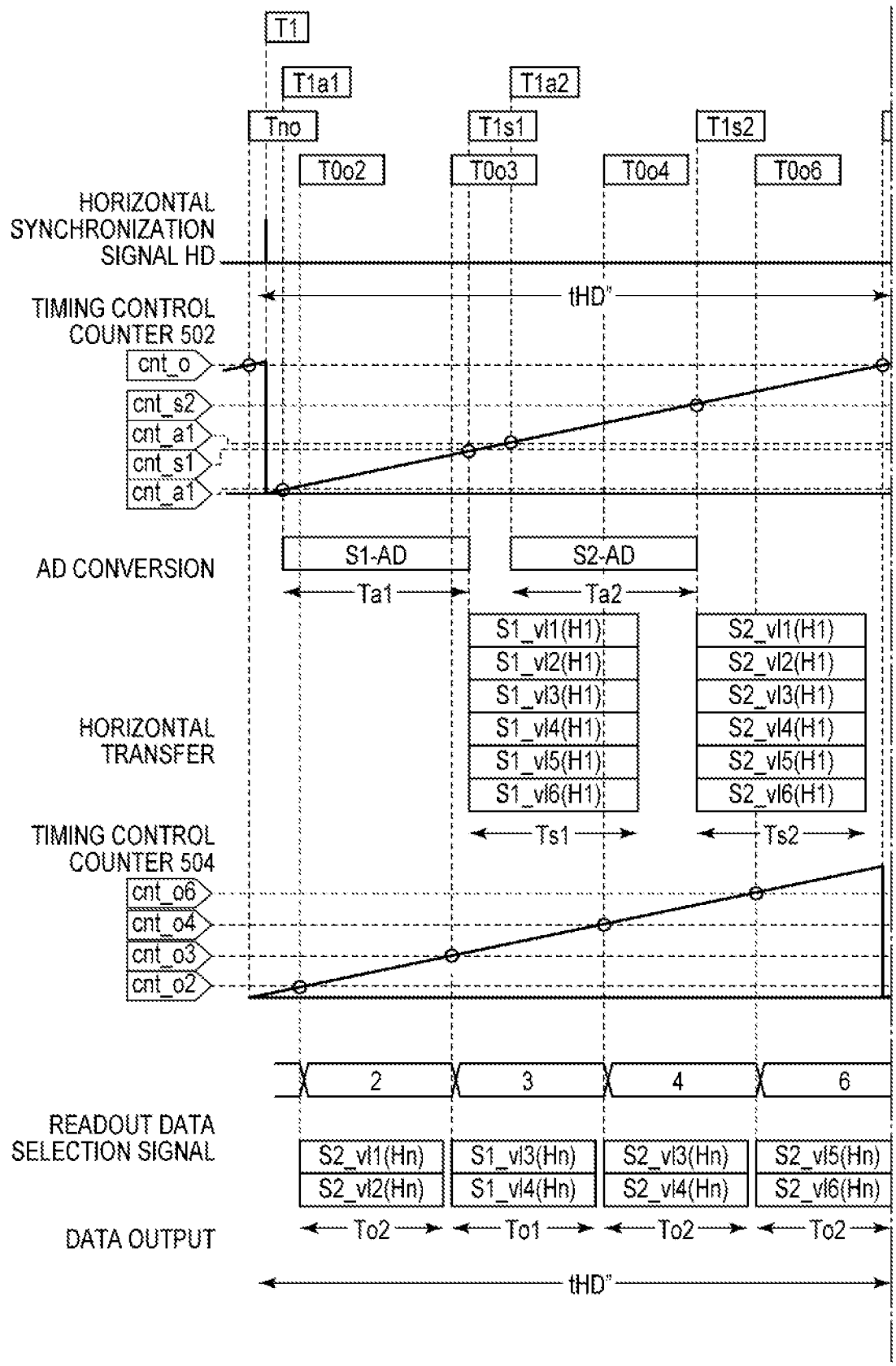
FIG. 10A and FIG. 10B are timing charts illustrating a method of driving the imaging device according to the first embodiment of the present invention (Part 3).
Figure 10B:
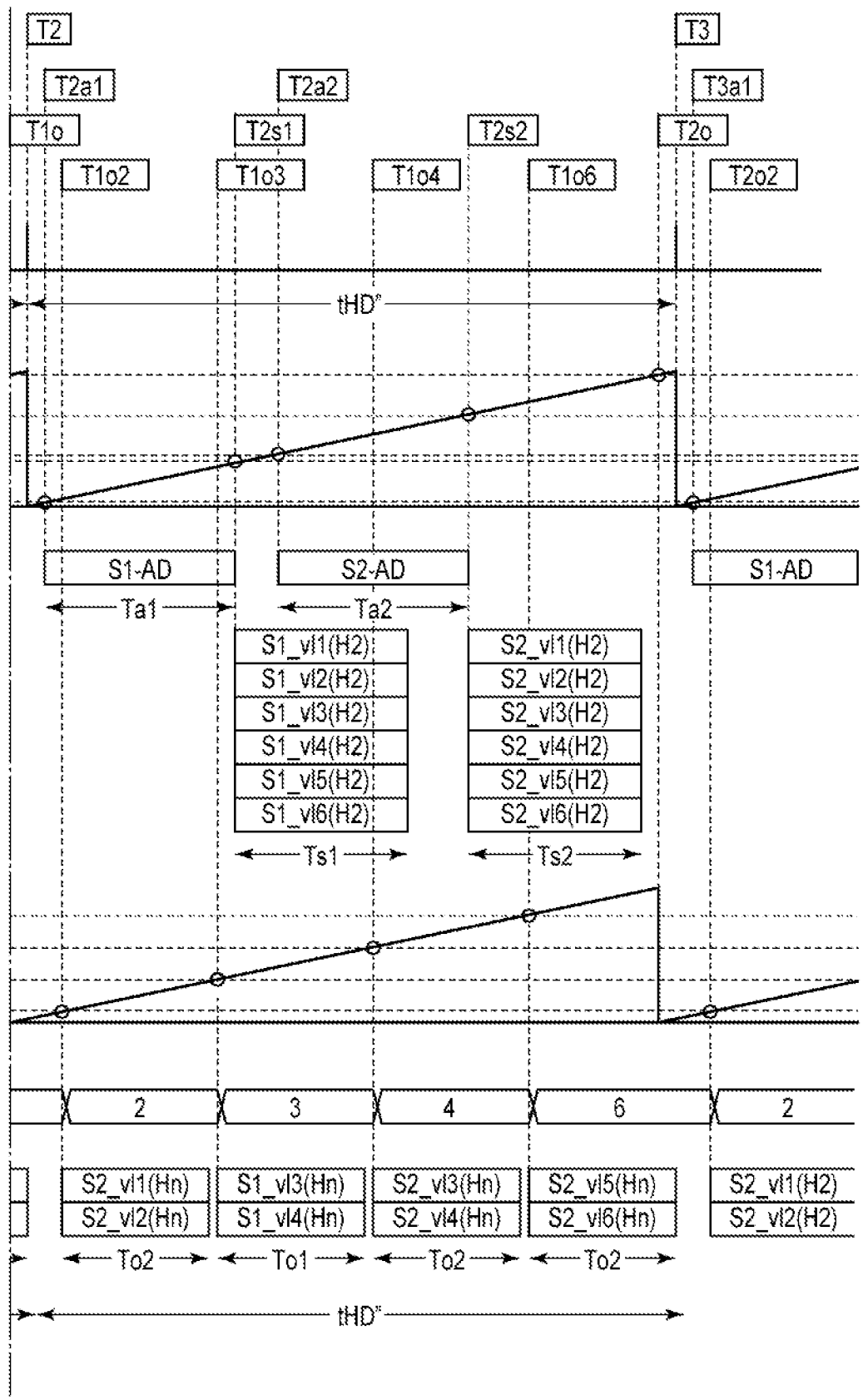

FIG. 10A and FIG. 10B illustrate another drive example of the AD conversion unit 105, the horizontal transfer unit 106, the data processing unit 107, and the signal output unit 108. This drive example is to output six rows of image generation data and output two rows of focus detection data. In the following, differences from the drive example of FIG. 8A and FIG. 8B will be mainly described.

Since the operations from time T1 to time T1o, that is, the operations of performing AD conversion on data of the pixels P from the ((n−1)×6+1)-th row to the (n×6)-th row and writing the converted data to the data processing unit 107 are the same as those of the drive example of FIG. 8A and FIG. 8B, the description thereof will be omitted here.

At time T1o, six rows of image generation data corresponding to the pixels P from the first row to the sixth row are stored in the image generation data storage unit 601 of the data processing unit 107. Further, six rows of focus detection data corresponding to the pixels P from the first row to the sixth row are stored in the focus detection data storage unit 602 of the data processing unit 107.

In this drive example, the setting values cnt_o2, cnt_o3, cnt_o4, and cnt_o6 are each set to a smaller value than the maximum value of the values that can be taken by the timing control counter 504. On the other hand, the setting values cnt_o1 and cnt_o5 are each set to a larger value than the maximum value of the values that can be taken by the timing control counter 504.

At subsequent time T1o2, it is assumed that the count value of the timing control counter 504 reaches the setting value cnt_o2. In response to the count value of the timing control counter 504 reaching the setting value cnt_o2, the control signal generation unit 505 sets a readout data selection signal to 2 that is the value allocated to the setting value cnt_o2. Similarly, when the count value of the timing control counter 504 reaches the setting value cnt_o3, the control signal generation unit 505 sets a readout data selection signal to 3 that is the value allocated to the setting value cnt_o3. Further, when the count value of the timing control counter 504 reaches the setting value cnt_o4, the control signal generation unit 50S sets a readout data selection signal to 4 that is the value allocated to the setting value cnt_o4. Further, when the count value of the timing control counter 504 reaches the setting value cnt_o6, the control signal generation unit 505 sets a readout data selection signal to 6 that is the value allocated to the setting value cnt_o6.

The data processing unit 107 selects data of corresponding two rows from the image generation data storage unit 601 or the focus detection data storage unit 602 in response to a readout data selection signal supplied from the control unit 102 and starts readout in the same manner as the drive example of FIG. 8A and FIG. 8B. Each readout data is subjected to data processing in the calculation unit 605 and output from the signal output unit 108. The number of signals corresponding to the focus detection data out of the signals output from the signal output unit 108 is less than the number of pixel signals output in parallel from the pixel unit 104.

In the drive example of FIG. 10A and FIG. 10B, since the count value of the timing control counter 504 becomes neither the values of the setting value cnt_o1 nor cnt_o5, the readout data selection signal will not become any of 1 and 5 that are the values allocated to the setting value cnt_o1 and cnt_o5. That is, the data held in the holding units S1_vl1 and S1_vl2 of the focus detection data storage unit 602 corresponding to the readout data selection signal of 1 are not output. Further, the data held in the holding units S1_vl5 and S1_vl6 of the focus detection data storage unit 602 corresponding to the readout data selection signal of 5 are not output. Therefore, out of six rows of focus detection data digitally converted simultaneously in one horizontal period, only two rows of the focus detection data are output, and four rows of the focus detection data are not output.

In the drive example of FIG. 10A and FIG. 10B, the period required for outputting data is (To1×1+To2×3). In the drive example of FIG. 10A and FIG. 10B, if the cycle of the horizontal synchronization signal HD is tHD", the period required for outputting data is expressed as follows.

$$To1 \times 1 + To2 \times 3 \leq tHD''$$

The cycle tHD of the horizontal synchronization signal HD in the drive example of FIG. 10A and FIG. 10B is shorter than the cycle tHD' of the horizontal synchronization signal HD in the drive example of FIG. 9A and FIG. 9B, and one horizontal period can be much shorter than that in the drive example of FIG. 8A and FIG. 8B.

As described above, according to the drive method of the present embodiment, since it is possible to suitably select the number of rows from which focus detection data are output without depending on the number of rows on which AD conversion is simultaneously performed, it is possible to adjust the density of focus detection data more finely. Accordingly, it is possible to achieve both a faster readout operation and AF performance.

Note that, although all the six rows of image generation data are output in the drive example described above, image generation data may be reduced in the same manner as focus detection data.

Second Embodiment

Figure 11:
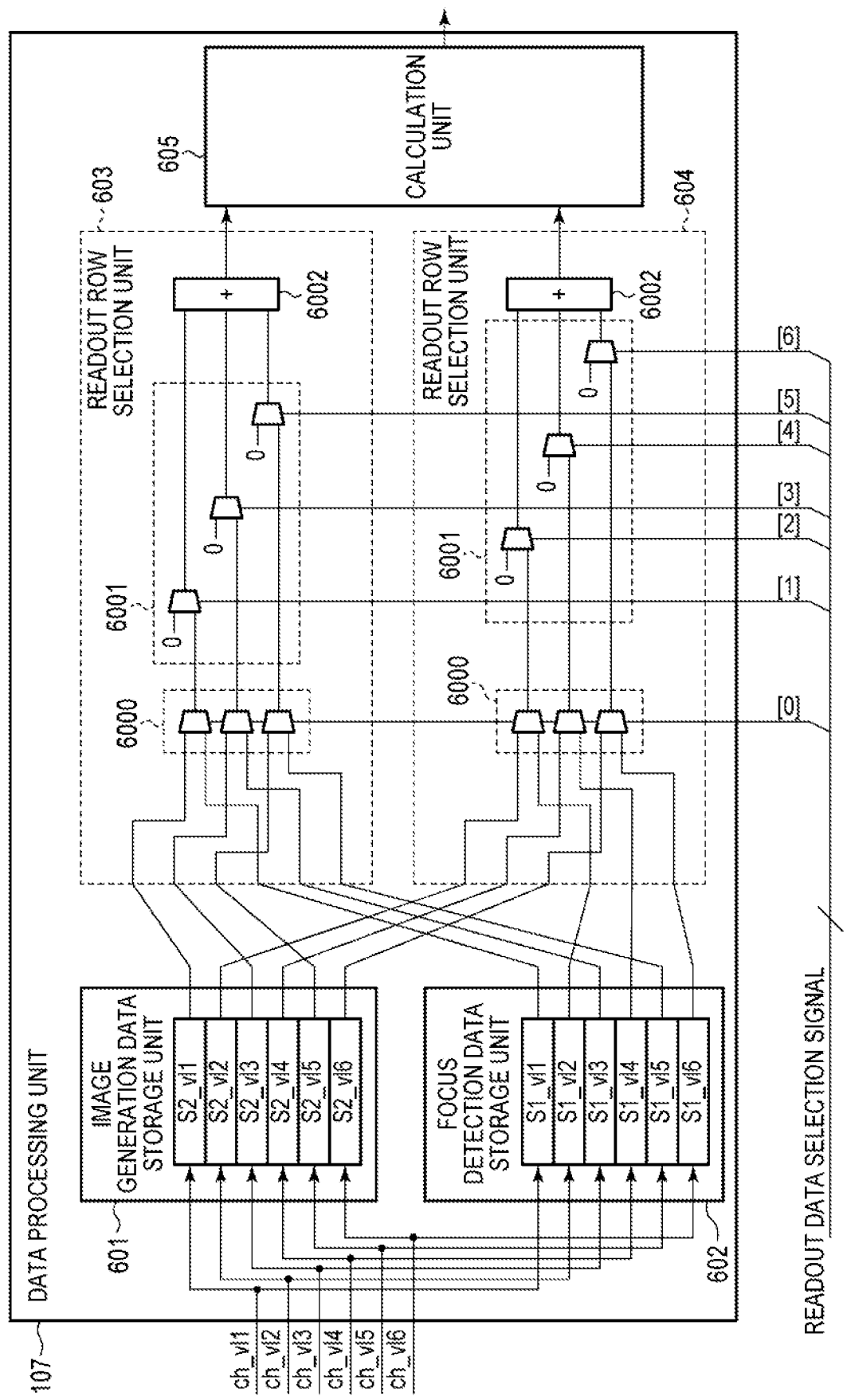
FIG. 11 is a schematic diagram illustrating a configuration example of a data processing unit in an imaging device according to a second embodiment of the present invention.

An imaging device according to a second embodiment of the present invention will be described with reference to FIG. 11. The same components as those in the imaging device according to the first embodiment are labeled with the same references, and the description thereof will be omitted or simplified. FIG. 11 is a schematic diagram illustrating a configuration example of a data processing unit in the imaging device according to the present embodiment.

The overall configuration of the imaging device according to the present embodiment is the same as the imaging device according to the first embodiment illustrated in FIG. 1. The configuration of the imaging device according to the present embodiment will be described below mainly for features different from the imaging device according to the first embodiment.

Although the control unit 102 in the imaging device of the present embodiment is the same as the control unit 102 in the imaging device of the first embodiment illustrated in FIG. 6 in terms of configuration, there is a difference in the readout data selection signal generated by the control signal generation unit 505 as one of the data processing unit control signals. That is, a readout data selection signal output by the control unit 102 of the present embodiment is configured such that two or more rows may be specified for data to be simultaneously read out.

The readout data selection signal in the present embodiment switches at a timing when the count value of the timing control counter 504 is a setting value cnt_o1p or a setting value cnt_o2p (p is an integer that is one or greater and six or less) and is used for selecting data to be read out.

When the count value of the timing control counter 504 and the setting value cnt_o1p are the same, the control unit 102 sets a readout data selection signal so as to select one corresponding row out of six rows of focus detection data held in the focus detection data storage unit 602. Further, when the count value of the timing control counter 504 and the setting value cnt_o2p are the same, the control unit 102 sets a readout data selection signal so as to select one corresponding row out of six rows of image generation data held in the image generation data storage unit 601.

In this example, the readout data selection signal is a seven-bit signal. Further, the bit [0] of the readout data selection signal is allocated for determination as to whether the setting value is the setting value cnt_o1p or the setting value cnt_o2p. Further, the bit [p] (p is an integer that is 1 or greater and 6 or less) of the readout data selection signal is allocated to the setting values cnt_o1p and cnt_o2p. That is, the bit [0] of the readout data selection signal is a signal used for selecting one of image generation data and focus detection data. Further, the bit [n] (n is an integer that is 1 or greater and 6 or less) of the readout data selection signal is a signal used for selecting the holding unit S1_vln and the holding unit S2_vln.

The data processing unit 107 in the imaging device of the present embodiment differs from the data processing unit 107 (FIG. 7) of the imaging device of the first embodiment in the configuration of the readout row selection units 603 and 604 of the data processing unit 107, as illustrated in FIG. 11.

That is, each of the readout row selection unit 603 and the readout row selection unit 604 of the data processing unit 107 in the imaging device of the present embodiment includes readout data selection units 6000 and 6001 and an adder unit 6002, as illustrated in FIG. 11. The input data to the readout row selection units 603 and 604 are the same as those in the first embodiment.

The readout data selection unit 6000 of the readout row selection unit 603 includes a selector that selects one of the data of the holding unit S2_vl1 and the data of the holding unit S1_vl1 in accordance with the value of the bit [0] of the readout data selection signal. Further, the readout data selection unit 6000 of the readout row selection unit 603 includes a selector that selects one of the data of the holding unit S2_vl3 and the data of the holding unit S1_vl3 in accordance with the value of the bit 101 of the readout data selection signal. Further, the readout data selection unit 6000 of the readout row selection unit 603 includes a selector that selects one of the data of the holding unit S2_vl5 and the data of the holding unit S1_vl5 in accordance with the value of the bit [0] of the readout data selection signal.

The readout data selection unit 6001 of the readout row selection unit 603 includes a selector that selects one of the data of the holding unit S2_vl1 and the data of the holding unit S1_vl1 or 0 in accordance with the value of the bit [1] of the readout data selection signal. Further, the readout data selection unit 6001 of the readout row selection unit 603 includes a selector that selects one of the data of the holding unit S2_vl3 and the data of the holding unit S1_vl3 or 0 in accordance with the value of the bit [3] of the readout data selection signal. Further, the readout data selection unit 6001 of the readout row selection unit 603 includes a selector that selects one of the data of the holding unit S2_vl5 and the data of the holding unit S1_vl5 or 0 in accordance with the value of the bit [5] of the readout data selection signal.

The adder unit 6002 of the readout row selection unit 603 sums values output from the readout data selection unit 6001 of the readout row selection unit 603 and outputs the sum.

Similarly, the readout data selection unit 6000 of the readout row selection unit 604 includes a selector that selects one of the data of the holding unit S2_vl2 and the data of the holding unit S1_vl2 in accordance with the value of the bit [0] of the readout data selection signal. Further, the readout data selection unit 6000 of the readout row selection unit 604 includes a selector that selects one of the data of the holding unit S2_vl4 and the data of the holding unit S1_vl4 in accordance with the value of the bit [ ] of the readout data selection signal. Further, the readout data selection unit 6000 of the readout row selection unit 604 includes a selector that selects one of the data of the holding unit S2_vl6 and the data of the holding unit S1_vl6 in accordance with the value of the bit [0] of the readout data selection signal.

The readout data selection unit 6001 of the readout row selection unit 604 includes a selector that selects one of the data of the holding unit S2_vl2 and the data of the holding unit S1_vl2 or 0 in accordance with the value of the bit [2] of the readout data selection signal. Further, the readout data selection unit 6001 of the readout row selection unit 604 includes a selector that selects one of the data of the holding unit S2_vl4 and the data of the holding unit S1_vl4 or 0 in accordance with the value of the bit [4] of the readout data selection signal. Further, the readout data selection unit 6001 of the readout row selection unit 604 includes a selector that selects one of the data of the holding unit S2_vl6 and the data of the holding unit S1_vl6 or 0 in accordance with the value of the bit [6] of the readout data selection signal.

The adder unit 6002 of the readout row selection unit 604 sums values output from the readout data selection unit 6001 of the readout row selection unit 604 and outputs the sum.

In such a way, each of the readout row selection units 603 and 604 selects data stored in the image generation data storage unit 601 and the focus detection data storage unit 602 in accordance with a readout data selection signal supplied from the control unit 102, sums the values of the selected data, and outputs the sum.

The configuration and the operation of the readout row selection units 603 and 604 will be described below in detail with a specific example. Note that, since the readout row selection unit 603 and the readout row selection unit 604 have the same configuration though input data are different, the configuration and the operation will be described here with reference to the readout row selection unit 603.

The readout data selection unit 6000 selects any one of focus detection data held in the holding units S1_vl1 to S1_vl6 and image generation data held in the holding units S2_vl1 to S2_vl6 in accordance with the bit [0] of the readout data selection signal. Herein, when the bit [0] of the readout data selection signal is at High level, focus detection data is selected, and when the bit [0] of the readout data selection signal is at Low level, image generation data is selected.

The readout data selection unit 6001 selects data input to the adder unit 6002 out of data selected by the readout data selection unit 6000. For example, when focus detection data is selected by the readout data selection unit 6000, if the bit [n] (n is an integer that is 1 or greater and 6 or less) of the readout data selection signal is at High level, focus detection data of the holding unit S1_$vln$ is selected. Further, when image generation data is selected by the readout data selection unit 6000, if the bit [n] (n is an integer that is 1 or greater and 6 or less) of the readout data selection signal is at High level, image generation data of the holding unit S2_$vln$ is selected. If the bit [n] (n is an integer that is 1 or greater and 6 or less) of the readout data selection signal is at Low level, 0 is input to the adder unit 6002 regardless of the output of the readout data selection unit 6000.

In the first embodiment, the number of rows on which data are simultaneously read out from the image generation data storage unit 601 and the focus detection data storage unit 602 is fixed to two. In contrast, in the present embodiment, there is no restriction on the number of rows on which data are simultaneously read out from the image generation data storage unit 601 and the focus detection data storage unit 602. That is, out of the bit [1] to bit [6] of the readout data selection signal, any number of bits may be at High level.

For example, when focus detection data is selected in the readout data selection unit 6000, it is assumed that all the bit [1] to bit [6] of the readout data selection signal are simultaneously at High level. In such a case, data of the holding units S1_vl1, S1_vl3, and S1_vl5 are simultaneously input to the adder unit 6002 of the readout row selection unit 603, and the adder unit 6002 outputs S1_vl1+S1_vl3+S1_vl5 as first readout data to the calculation unit 605. Further, data of the holding units S1_vl2, S1_vl4, and S1_vl6 are simultaneously input to the adder unit 6002 of the readout row selection unit 604, and the adder unit 6002 outputs S1_vl2+S1_vl4+S1_vl6 as second readout data to the calculation unit 605.

Next, a method of driving the imaging device according to the present embodiment will be described with reference to FIG. 12A to FIG. 13B. FIG. 12A-FIG. 12B, and FIG. 13A-FIG. 13B are timing charts illustrating the method of driving the imaging device according to the present embodiment.

In the first embodiment, some of data of focus detection data on which AD conversion is simultaneously performed in one horizontal period are not output, and thereby one horizontal period is shortened. In contrast, in the present embodiment, focus detection data on which AD conversion is simultaneously performed in one horizontal period are added in the row direction to reduce the data amount, and thereby one horizontal period is shortened.

Figure 12A:
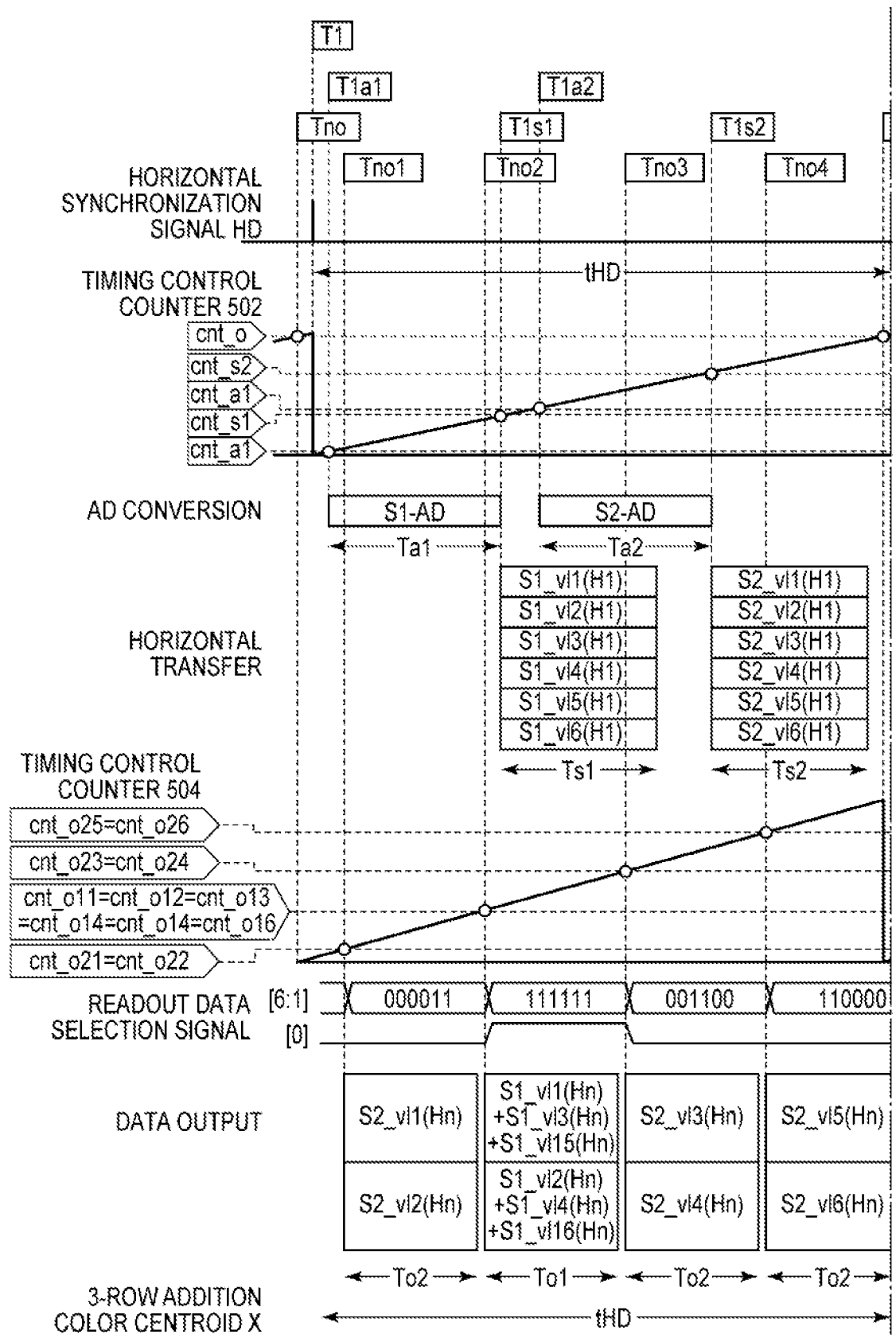
FIG. 12A and FIG. 12B are timing charts illustrating a method of driving the imaging device according to the second embodiment of the present invention (Part 1).
Figure 12B:
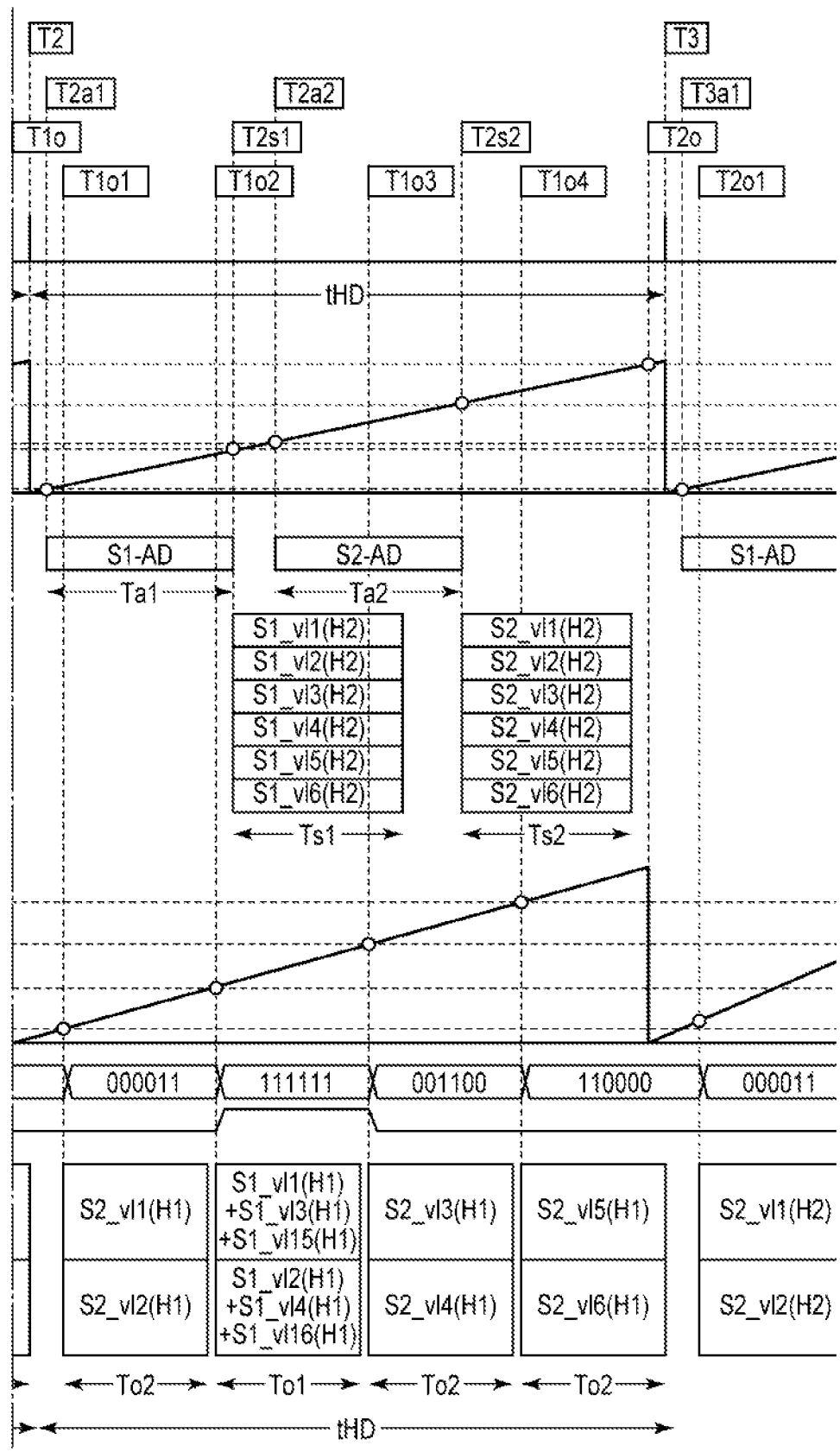

FIG. 12A and FIG. 12B illustrate a drive example of the AD conversion unit 105, the horizontal transfer unit 106, the data processing unit 107, and the signal output unit 108. This drive example is to output six rows of image generation data in a unit of two rows without addition, sum six rows of focus detection data in a unit of three rows, and output the sums as two rows of data. Specifically, the data held in the holding units S2_vl1 and S2_vl2 are simultaneously output, the data held in the holding units S2_vl3 and S2_vl4 are simultaneously output, and the data held in the holding units S2_vl5 and S2_vl6 are simultaneously output. Further, the data held in the holding units S1_vl1, S1_vl3, and S1_vl5 are summed, and the sum is output as one row of data, and at the some time, the data held in the holding units S1_vl2, S1_vl4, and S1_vl6 are summed, and the sum is output as one row of data. In the following, differences from the drive example of FIG. 8A and FIG. 8B will be mainly described.

Since the operations from time T1 to time T1$o$, that is, the operations of performing AD conversion on data of the pixels P from the ((n−1)×6+1)-th row to the (n×6)-th row and writing the converted data to the data processing unit 107 are the same as those of the drive example of FIG. 8A and FIG. 8B, the description thereof will be omitted here.

At time T1$o$, six rows of image generation data corresponding to the pixels P from the first row to the sixth row are stored in the image generation data storage unit 601 of the data processing unit 107. Further, six rows of focus detection data corresponding to the pixels P from the first row to the sixth row are stored in the focus detection data storage unit 602 of the data processing unit 107.

In this drive example, a setting value cnt_o21 and a setting value cnt_o22 used for controlling readout timings of image generation data are the same, a setting value cnt_o23 and a setting value cnt_o24 are the same, and a setting value cnt_o25 and a setting value cnt_o26 are the same. Further, all of setting values cnt_o11, cnt_o12, cnt_o13, cnt_o14, cnt_o15, and cnt_o16 used for controlling readout timings of focus detection data are the same. All these setting values are set to values smaller than the maximum value that can be taken by the timing control counter 504.

At subsequent time T1$o$1, it is assumed that the count value of the timing control counter 504 reaches the setting values cnt_o21 and cnt_o22. Accordingly, the bit [0] of the readout data selection signal corresponding to the setting values cnt_o21 and cnt_o22 is at Low level, the bits [1] and [2] thereof are at High level, and the remaining bits are at Low level.

In response to the bit [0] of the readout data selection signal being at Low level, the readout data selection unit 6000 of the readout row selection unit 603 selects image generation data. In response to the bit [1] of the readout data selection signal being at High level, the readout data selection unit 6001 of the readout row selection unit 603 selects data of the holding unit S2_vl1 and inputs the selected data to the adder unit 6002 of the readout row selection unit 603. Further, in response to the bits [3] and [5] of the readout data selection signal being at Low level, the readout data selection unit 6001 of the readout row selection unit 603 selects neither the data of the holding unit S2_vl3 nor S2_vl5 and inputs 0 to the adder unit 6002 of the readout row selection unit 603. As set forth, the output of the readout row selection unit 603 is the data held in the holding unit S2_vl1.

In response to the bit [0] of the readout data selection signal being at Low level, the readout data selection unit 6000 of the readout row selection unit 604 selects image generation data. In response to the bit [2] of the readout data selection signal being at High level, the readout data selection unit 6001 of the readout row selection unit 604 selects data held in the holding unit S2_vl2 and inputs the selected data to the adder unit 6002 of the readout row selection unit 604. Further, in response to the bits [4] and [6] of the readout data selection signal being at Low level, the readout data selection unit 6001 of the readout row selection unit 604 selects neither the data held in the holding unit S2_vl4 nor S2_vl6. The readout data selection unit 6001 of the readout row selection unit 604 inputs 0 to the adder unit 6002 of the readout row selection unit 604. As set forth, the output of the readout row selection unit 604 is the data held in the holding unit S2_vl2.

At subsequent time T1o2, it is assumed that the count value of the timing control counter 504 reaches the setting values cnt_o11, cnt_o12, cnt_o13, cnt_o14, cnt_o15, and cnt_o16. Accordingly, the bit [0] of the readout data selection signal corresponding to the setting values cnt_o11, cnt_o12, cnt_o13, cnt_o14, cnt_o15, and cnt_o16 is at High level. Further, all the bit [1] to bit [6] of the readout data selection signal are at High level.

In response to the bit [0] of the readout data selection signal being at High level, the readout data selection unit 6000 of the readout row selection unit 603 selects focus detection data. In response to the bits [1], [3], and [5] of the readout data selection signal being at High level, the readout data selection unit 6001 of the readout row selection unit 603 selects data of the holding units S1_vl1, S1_vl3, and S1_vl5. The readout data selection unit 6001 of the readout row selection unit 603 inputs the data of the selected holding units S1_vl1, S1_vl3 and S1_vl5 to the adder unit 6002 of the readout row selection unit 603. As set forth, the sum value of the data held in the holding units S1_vl1, S1_vl3, and S1_vl5 is the output of the readout row selection unit 603.

In response to the bit [0] of the readout data selection signal being at High level, the readout data selection unit 6000 of the readout row selection unit 604 selects focus detection data. In response to the bits [2], [4], and [6] of the readout data selection signal being at High level, the readout data selection unit 6001 of the readout row selection unit 604 selects data of the holding units S1_vl2, S1_vl4, and S1_vl6. The readout data selection unit 6001 of the readout row selection unit 604 inputs the data of the selected holding unit S1_vl2, S1_vl4, and S1_vl6 to the adder unit 6002 of the readout row selection unit 604. As set forth, the sum value of the data held in the holding units S1_vl2, S1_vl4, and S1_vl6 is the output of the readout row selection unit 604.

At subsequent time T1o3, it is assumed that the count value of the timing control counter 504 reaches the setting values cnt_o23 and cnt_o24. Accordingly, the bit [0] of the readout data selection signal corresponding to the setting values cnt_o23 and cnt_o24 is at Low level, the bits [3] and [4] thereof are at High level, and the remaining bits are at Low level.

In response to the bit [0] of the readout data selection signal being at Low level, the readout data selection unit 6000 of the readout row selection unit 603 selects image generation data. In response to the bit [3] of the readout data selection signal being at High level, the readout data selection unit 6001 of the readout row selection unit 603 selects data of the holding unit S2_vl3 and inputs the selected data to the adder unit 6002 of the readout row selection unit 603. Further, in response to the bits [1] and [5] of the readout data selection signal being at Low level, the readout data selection unit 6001 of the readout row selection unit 603 selects neither the data of the holding unit S2_vl1 nor S2_vl5. The readout data selection unit 6001 of the readout row selection unit 603 input 0 to the adder unit 6002 of the readout row selection unit 603. As set forth, the output of the readout row selection unit 603 is the data held in the holding unit S2_vl3.

In response to the bit [0] of the readout data selection signal being at Low level, the readout data selection unit 6000 of the readout row selection unit 604 selects image generation data. In response to the bit [4] of the readout data selection signal being at High level, the readout data selection unit 6001 of the readout row selection unit 604 selects data of the holding unit S2_vl4 and inputs the selected data to the adder unit 6002 of the readout row selection unit 604. Further, in response to the bits [2] and [6] of the readout data selection signal being at Low level, the readout data selection unit 6001 of the readout row selection unit 604 selects neither the data of the holding unit S2_vl2 nor S2_vl6. The readout data selection unit 6001 of the readout row selection unit 604 inputs 0 to the adder unit 6002 of the readout row selection unit 604. As set forth, the output of the readout row selection unit 604 is the data held in the holding unit S2_vl4.

At subsequent time T1o4, it is assumed that the count value of the timing control counter 504 reaches the setting values cnt_o25 and cnt_o26. Accordingly, the bit [0] of the readout data selection signal corresponding to the setting values cnt_o25 and cnt_o26 is at Low level, the bits [5] and [6] thereof are at High level, and the remaining bits are at Low level.

In response to the bit [0] of the readout data selection signal being at Low level, the readout data selection unit 6000 of the readout row selection unit 603 selects image generation data. In response to the bit [5] of the readout data selection signal being at High level, the readout data selection unit 6001 of the readout row selection unit 603 selects data of the holding unit S2_vl5 and inputs the selected data to the adder unit 6002 of the readout row selection unit 603. Further, in response to the bits [1] and [3] of the readout data selection signal being at Low level, the readout data selection unit 6001 of the readout row selection unit 603 selects neither the data of the holding unit S2_vl1 nor S2_vl3. The readout data selection unit 6001 of the readout row selection unit 603 inputs 0 to the adder unit 6002 of the readout row selection unit 603. As set forth, the output of the readout row selection unit 603 is the data held in the holding unit S2_vl5.

In response to the bit [0] of the readout data selection signal being at Low level, the readout data selection unit 6000 of the readout row selection unit 604 selects image generation data. In response to the bit [6] of the readout data selection signal being at High level, the readout data selection unit 6001 of the readout row selection unit 604 selects data of the holding unit S2_vl6 and inputs the selected data to the adder unit 6002 of the readout row selection unit 604. Further, in response to the bits [2] and [4] of the readout data selection signal being at Low level, the readout data selection unit 6001 of the readout row selection unit 604 selects neither the data of the holding unit S2_vl2 nor S2_vl4. The readout data selection unit 6001 of the readout row selection unit 604 inputs 0 to the adder unit 6002 of the readout row selection unit 604. As set forth, the output of the readout row selection unit 604 is the data held in the holding unit S2_vl6.

Respective data output from the readout row selection units 603 and 604 are subjected to data processing in the calculation unit 605 and output from the signal output unit 108. The number of signals corresponding to the focus detection data out of the signals output from the signal output unit 108 is less than the number of pixel signals output in parallel from the pixel unit 104.

In the drive example of FIG. 12A and FIG. 12B, the period required for outputting data is (To1×1+To2×3), which is shorter than the case of the drive examples of FIG. 8A-FIG. 8B, and FIG. 9A-FIG. 9B and is the same as the case of the drive example of FIG. 10A-FIG. 10B. The cycle of one horizontal period is also the same as that in the drive example illustrated in FIG. 10A and FIG. 10B, one horizontal period can be shorter than in the drive examples of FIG. 8A-FIG. 8B, and FIG. 9A-FIG. 9B.

Figure 13A:
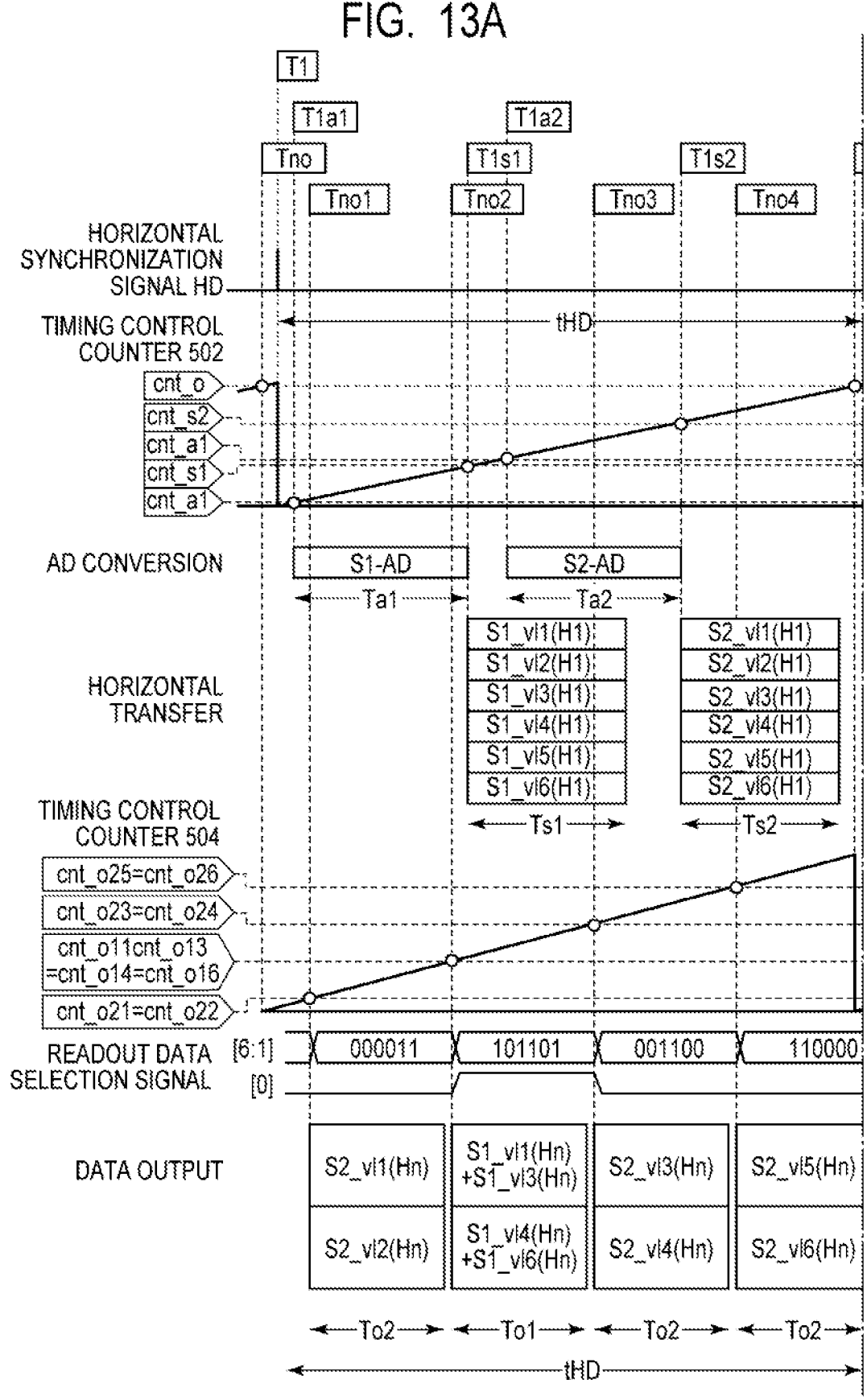
FIG. 13A and FIG. 13B are timing charts illustrating a method of driving the imaging device according to the second embodiment of the present invention (Part 2).
Figure 13B:
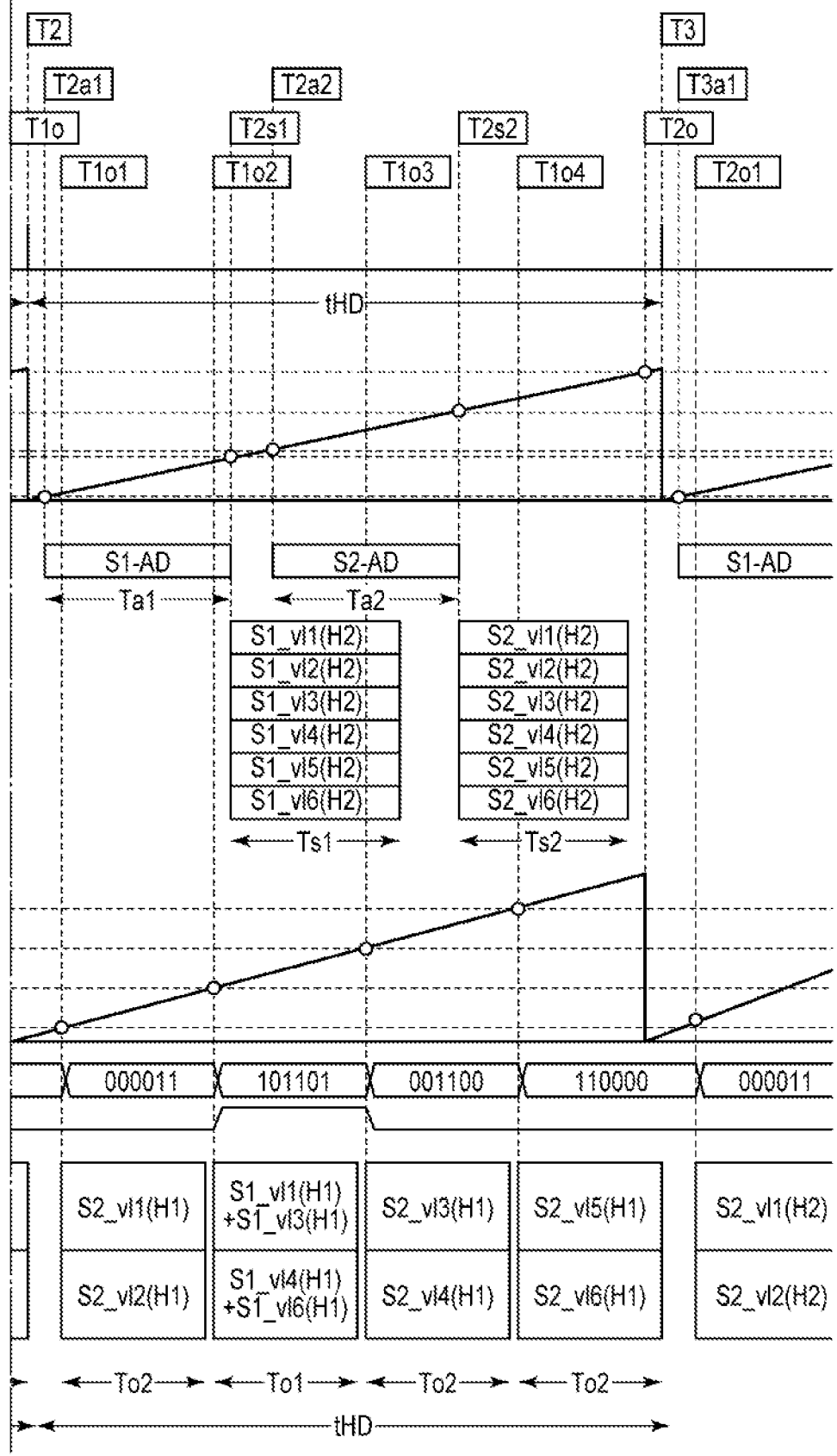

FIG. 13A and FIG. 13B illustrate another drive example of the AD conversion unit 105, the horizontal transfer unit 106, the data processing unit 107, and the signal output unit 108. This drive example is to output six rows of image generation data in a unit of two rows without addition, sum four rows of focus detection data in a unit of two rows out of six rows of focus detection data, and output the sums as two rows of data. In this drive example, focus detection data not used in addition are not output. In the following, differences from the drive example of FIG. 12A and FIG. 12B will be mainly described.

Since the operations from time T1 to time T1o, that is, the operations of performing AD conversion on data of the pixels P from the ((n−1)×6+1)-th row to the (n×6)-th row and writing the converted data to the data processing unit 107 are the same as those of the drive example of FIG. 12A and FIG. 12B, the description thereof will be omitted here.

At time T1o, six rows of image generation data corresponding to the pixels P from the first row to the sixth row are stored in the image generation data storage unit 601 of the data processing unit 107. Further, six rows of focus detection data corresponding to the pixels P from the first row to the sixth row are stored in the focus detection data storage unit 602 of the data processing unit 107.

In this drive example, the relationship between the setting values cnt_o21, cnt_o22, cnt_o23, cnt_o24, cnt_o25, and cnt_o26 used for controlling readout timings of image generation data is the same as that of the case of the drive example of FIG. 12A and FIG. 12B. Further, the setting values cnt_o11, cnt_o13, cnt_o14, and cnt_o16 used for controlling readout timings of focus detection data are set to values smaller than the maximum value of the values that can be taken by the timing control counter 504. The setting values cnt_o12 and cnt_o15 are set to values larger than the maximum value of the values that can be taken by the timing control counter 504.

At subsequent time T1o1, it is assumed that the count value of the timing control counter 504 reaches the setting values cnt_o21 and cnt_o22. Accordingly, the bit [0] of the readout data selection signal corresponding to the setting values cnt_o21 and cnt_o22 is at Low level, the bits [1] and [2] thereof are at High level, and the remaining bits are at Low level.

In response to the bit [0] of the readout data selection signal being at Low level, the readout data selection unit 6000 of the readout row selection unit 603 selects image generation data. In response to the bit [1] of the readout data selection signal being at High level, the readout data selection unit 6001 of the readout row selection unit 603 selects data of the holding unit S2_vl1 and inputs the selected data to the adder unit 6002 of the readout row selection unit 603. Further, in response to the bits [3] and [5] of the readout data selection signal being at Low level, the readout data selection unit 6001 of the readout row selection unit 603 selects neither the data of the holding unit S2_vl3 nor S2_vl5. The readout data selection unit 6001 of the readout row selection unit 603 inputs 0 to the adder unit 6002 of the readout row selection unit 603. As set forth, the output of the readout row selection unit 603 is the data held in the holding unit S2_vl1.

In response to the bit [0] of the readout data selection signal being at Low level, the readout data selection unit 6000 of the readout row selection unit 604 selects image generation data. In response to the bit [2] of the readout data selection signal being at High level, the readout data selection unit 6001 of the readout row selection unit 604 selects data of the holding unit S2_vl2 and inputs the selected data to the adder unit 6002 of the readout row selection unit 604. Further, in response to the bits [4] and [6] of the readout data selection signal being at Low level, the readout data selection unit 6001 of the readout row selection unit 604 selects neither the data of the holding unit S2_vl4 nor S2_vl6. The readout data selection unit 6001 of the readout row selection unit 604 inputs 0 to the adder unit 6002 of the readout row selection unit 604. As set forth, the output of the readout row selection unit 604 is the data held in the holding unit S2_vl2.

At subsequent time T1o2, it is assumed that the count value of the timing control counter 504 reaches the setting values cnt_o11, cnt_o13, cnt_o14, and cnt_o16. Accordingly, the bits [0], [1], [3], [4], and [6] of the readout data selection signal corresponding to the setting values cnt_o11, cnt_o13, cnt_o14, and cnt_o16 are at High level. The remaining bits [2] and [5] of the readout data selection signal are at Low level.

In response to the bit [0] of the readout data selection signal being at High level, the readout data selection unit 6000 of the readout row selection unit 603 selects focus detection data. In response to the bits [1] and [3] of the readout data selection signal being at High level, the readout data selection unit 6001 of the readout row selection unit 603 selects data of the holding units S1_vl1 and S1_vl3 and inputs the selected data to the adder unit 6002 of the readout row selection unit 603. Further, in response to the bit [5] of the readout data selection signal being at Low level, the readout data selection unit 6001 of the readout row selection unit 603 does not select the data of the holding unit S2_vl5 and inputs 0 to the adder unit 6002 of the readout row selection unit 603. As set forth, the sum value of the data held in the holding units S1_vl1 and S1_vl3 is the output of the readout row selection unit 603.

In response to the bit [0] of the readout data selection signal being at High level, the readout data selection unit 6000 of the readout row selection unit 604 selects focus detection data. In response to the bits [4] and [6] of the readout data selection signal being at High level, the readout data selection unit 6001 of the readout row selection unit 604 selects data of the holding units S1_vl4 and S1_vl6 and inputs the selected data to the adder unit 6002 of the readout row selection unit 604. Further, in response to the bit [2] of the readout data selection signal being at Low level, the readout data selection unit 6001 of the readout row selection unit 604 does not select the data of the holding unit S2_vl2 and inputs 0 to the adder unit 6002 of the readout row selection unit 604. As set forth, the sum value of the data held in the holding units S1_vl4 and S1_vl6 is the output of the readout row selection unit 604.

Note that the data held in the holding units S1_vl2 and S1_vl5 are not read out because the bits to which the readout data selection signal correspond do not become High level.

At subsequent time T1o3, it is assumed that the count value of the timing control counter 504 reaches the setting values cnt_o23 and cnt_o24. Accordingly, the bit [0] of the readout data selection signal corresponding to the setting values cnt_o23 and cnt_o24 is at Low level, the bits [3] and [4] thereof are at High level, and the remaining bits are at Low level.

In response to the bit [0] of the readout data selection signal being at Low level, the readout data selection unit 6000 of the readout row selection unit 603 selects image generation data. In response to the bit [3] of the readout data selection signal being at High level, the readout data selection unit 6001 of the readout row selection unit 603 selects data of the holding unit S2_vl3 and inputs the selected data to the adder unit 6002 of the readout row selection unit 603. Further, in response to the bits [1] and [5] of the readout data selection signal being at Low level, the readout data selection unit 6001 of the readout row selection unit 603 selects neither the data of the holding unit S2_vl1 nor S2_vl5. The readout data selection unit 6001 of the readout row selection unit 603 inputs 0 to the adder unit 6002 of the readout row selection unit 603. As set forth, the output of the readout row selection unit 603 is the data held in the holding unit S2_vl3.

In response to the bit [0] of the readout data selection signal being at Low level, the readout data selection unit 6000 of the readout row selection unit 604 selects image generation data. In response to the bit [4] of the readout data selection signal being at High level, the readout data selection unit 6001 of the readout row selection unit 604 selects data of the holding unit S2_vl4 and inputs the selected data to the adder unit 6002 of the readout row selection unit 604. Further, in response to the bits [2] and [6] of the readout data selection signal being at Low level, the readout data selection unit 6001 of the readout row selection unit 604 selects neither the data of the holding unit S2_vl2 nor S2_vl6. The readout data selection unit 6001 of the readout row selection unit 604 inputs 0 to the adder unit 6002 of the readout row selection unit 604. As set forth, the output of the readout row selection unit 604 is the data held in the holding unit S2_vl4.

At subsequent time T1o4, it is assumed that the count value of the timing control counter 504 reaches the setting values cnt_o25 and cnt_o26. Accordingly, the bit [0] of the readout data selection signal corresponding to the setting values cnt_o25 and cnt_o26 is at Low level, the bits [5] and [6] thereof are at High level, and the remaining bits are at Low level.

In response to the bit [0] of the readout data selection signal being at Low level, the readout data selection unit 6000 of the readout row selection unit 603 selects image generation data. In response to the bit [5] of the readout data selection signal being at High level, the readout data selection unit 6001 of the readout row selection unit 603 selects data of the holding unit S2_vl5 and inputs the selected data to the adder unit 6002 of the readout row selection unit 603. Further, in response to the bits [1] and [3] of the readout data selection signal being at Low level, the readout data selection unit 6001 of the readout row selection unit 603 selects neither the data of the holding unit S2_vl1 nor S2_vl3. The readout data selection unit 6001 of the readout row selection unit 603 inputs 0 to the adder unit 6002 of the readout row selection unit 603. As set forth, the output of the readout row selection unit 603 is the data held in the holding unit S2_vl5.

In response to the bit [0] of the readout data selection signal being at Low level, the readout data selection unit 6000 of the readout row selection unit 604 selects image generation data. In response to the bit [6] of the readout data selection signal being at High level, the readout data selection unit 6001 of the readout row selection unit 604 selects data of the holding unit S2_vl6 and inputs the selected data to the adder unit 6002 of the readout row selection unit 604. Further, in response to the bits [2] and [4] of the readout data selection signal being at Low level, the readout data selection unit 6001 of the readout row selection unit 604 selects neither the data of the holding unit S2_vl2 nor S2_vl4. The readout data selection unit 6001 of the readout row selection unit 604 inputs 0 to the adder unit 6002 of the readout row selection unit 604. As set forth, the output of the readout row selection unit 604 is the data held in the holding unit S2_vl6.

Respective data output from the readout row selection units 603 and 604 are subjected to data processing in the calculation unit 605 and output from the signal output unit 108. The number of signals corresponding to the focus detection data out of the signals output from the signal output unit 108 is less than the number of pixel signals output in parallel from the pixel unit 104.

In the drive example of FIG. 13A and FIG. 13B, the period required for outputting data is (To1×1+To2×3), which is the same as the case of the drive example of FIG. 12A and FIG. 12B.

As described above, according to the present embodiment, since the data amount is reduced by selectively adding or reducing six rows of focus detection data, it is possible to shorten the cycle of one horizontal period and achieve a faster readout operation.

Note that, although six rows of image generation data are output without addition in the present embodiment, these image generation data may be summed in the same manner as focus detection data.

Third Embodiment

A method of driving an imaging device according to a third embodiment of the present invention will be described with reference to FIG. 9A and FIG. 9B. The same components as those in the imaging device according to the first and second embodiments are labeled with the same references, and the description thereof will be omitted or simplified.

The first embodiment is configured such that some of focus detection data stored in the data processing unit 107 are not output, and thereby one horizontal period is shortened to increase the readout rate. In such a case, focus detection data that are not output from the data processing unit 107 are written to the focus detection data storage unit 602 of the data processing unit 107 via AD conversion or horizontal transfer in the same manner as other data output from the data processing unit 107.

However, data which are not output from the data processing unit 107 are originally not required to be stored in the data processing unit 107, and a process such as AD conversion, horizontal transfer, or the like is not required to be performed thereon. If the process such as AD conversion, horizontal transfer, or the like is not performed on these data, power consumption can be reduced.

In the present embodiment, a drive example of the imaging device that stops AD conversion or horizontal transfer on data which are not output from the data processing unit 107 and can reduce power consumption will be described. Note that, although an example of reducing power consumption in the drive example of FIG. 9A and FIG. 9B is illustrated here, the scheme of the present embodiment can be applied to other drive examples illustrated in the first and second embodiments in the same manner.

In the drive example of FIG. 9A and FIG. 9B, out of focus detection data stored in the focus detection data storage unit 602 of the data processing unit 107, data held in the holding units S1_vl1, S1_vl2, S1_vl5, and S1_vl6 are output from the data processing unit 107. On the other hand, out of focus detection data stored in the focus detection data storage unit 602 of the data processing unit 107, data held in the holding units S1_vl3 and S1_vl4 are not output from the data processing unit 107.

Accordingly, in the present embodiment, while data are stored in the holding units S1_vl1, S1_vl2, S1_vl5, and S1_vl6 of the focus detection data storage unit 602, no data is stored in the holding unit S1_vl3 or S1_vl4 in accordance with the following solution.

First, in the AD conversion period Ta1 in the drive example of FIG. 9A and FIG. 9B, the operation of a column AD conversion unit, that is, the column AD converters 203 and the holding units 204 connected to the signal lines cM_vl3 and the signal lines cM_vl4 (M is an integer from one to m) is stopped. For example, power supply of a column AD conversion unit connected to the signal lines cM_vl3 and cM_vl4 is shut down to stop the column AD conversion unit. Accordingly, power consumption can be reduced by the amount for the not-driven column AD conversion unit.

Further, during the horizontal transfer period Ts1 in the drive example of FIG. 9A and FIG. 9B, the horizontal transfer operation of the horizontal transfer line 402 to which digital data adout_cM_vl3 and adout_cM_vl4 corresponding to the signal lines cM_vl3 and cM_vl4 are output is stopped. For example, an horizontal transfer operation is stopped by gating the horizontal transfer clock of the horizontal transfer line 402 corresponding to data ch_vl3 and ch_vl4. Accordingly, power consumption can be reduced by the amount for the stopped horizontal transfer operation of the horizontal transfer line.

As described above, according to the present embodiment, power consumed by the column AD conversion unit and the horizontal transfer unit can be reduced.

Note that, although both AD conversion and horizontal transfer on a pixel signal corresponding to focus detection data which are not output from the data processing unit 107 are stopped to reduce power consumption in the present embodiment, only one of AD conversion and horizontal transfer may be stopped. For example, AD conversion may be performed on all the focus detection data, and the horizontal transfer may be performed on only some of the focus detection data. In such a case, while the effect of power consumption reduction is smaller compared to the case where neither AD conversion nor horizontal transfer is performed, power consumption may be reduced compared to the case where both AD conversion and horizontal transfer are performed.

Further, although it is assumed in the present embodiment that all of six rows of image generation data are output from the data processing unit 107, it is not necessarily required to output all the image generation data from the data processing unit 107 in the same manner as the focus detection data. In such a case, AD conversion or horizontal transfer on image generation data which are not output from the data processing unit 107 may be stopped to reduce power consumption.

Fourth Embodiment

Figure 14:
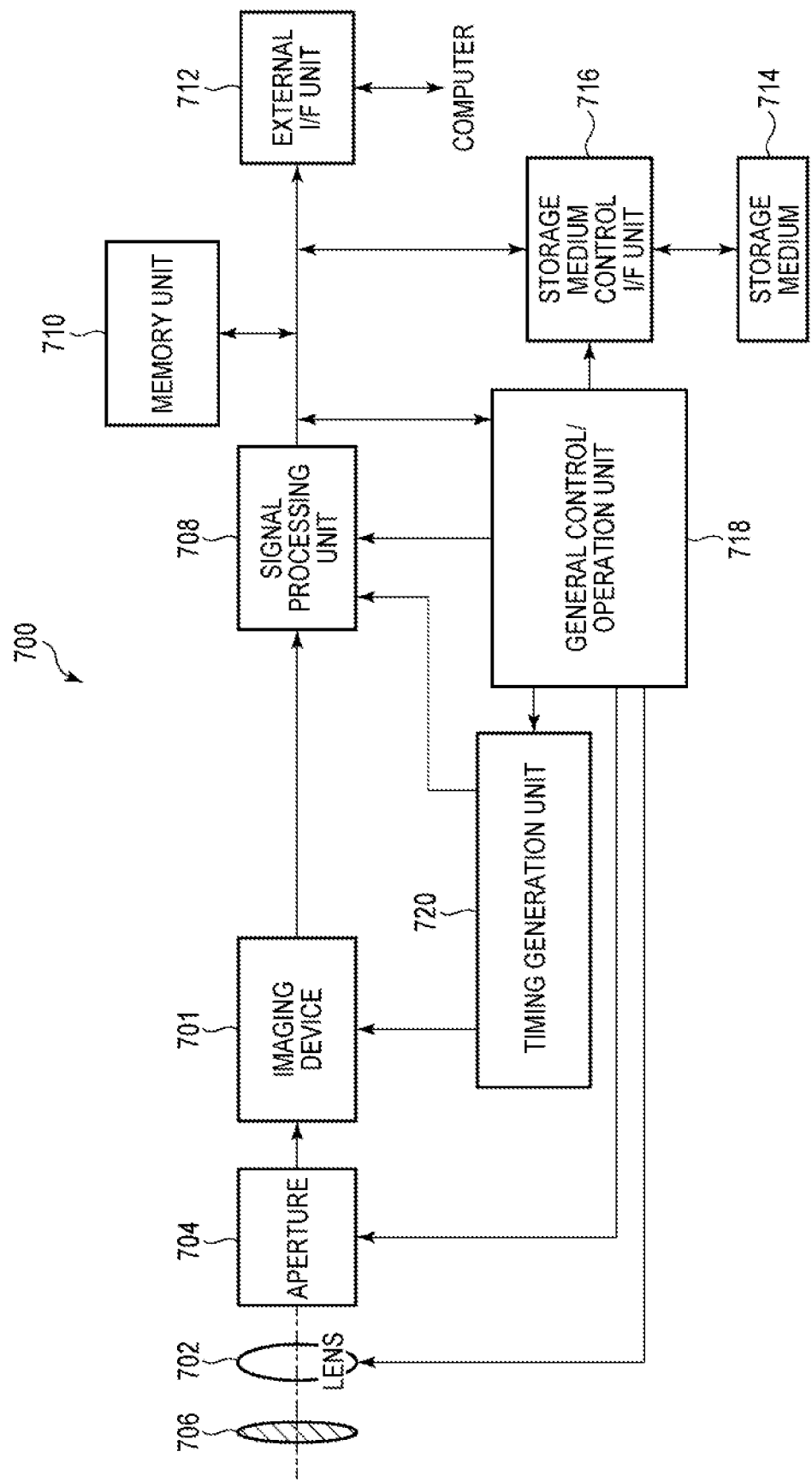
FIG. 14 is a block diagram illustrating a general configuration of an imaging system according to a fourth embodiment of the present invention.

An imaging system according to a fourth embodiment of the present invention will be described with reference to FIG. 14. FIG. 14 is a block diagram illustrating a general configuration of the imaging system according to the present embodiment.

The imaging device 1 described in the above first to third embodiments can be applied to various imaging systems. Examples of applicable imaging systems may be a digital still camera, a digital camcorder, a surveillance camera, a copying machine, a fax machine, a mobile phone, an on-vehicle camera, an observation satellite, or the like. Further, a camera module including an optical system such as a lens and an imaging device is also included in the imaging system. FIG. 14 illustrates a block diagram of a digital still camera as an example of these examples.

An imaging system 700 illustrated as an example in FIG. 14 includes an imaging device 701, a lens 702 that captures an optical image of a subject onto the imaging device 701, an aperture 704 for changing a light amount passing through the lens 702, and a barrier 706 for protecting the lens 702. The lens 702 and the aperture 704 form an optical system that collects a light onto the imaging device 701. The imaging device 701 is the imaging device 1 described in any of the first to third embodiments and converts an optical image captured by the lens 702 into image data.

Further, the imaging system 700 includes a signal processing unit 708 that processes an output signal output from the imaging device 701. The signal processing unit 708 generates image data from digital signals output by the imaging device 701. Further, the signal processing unit 708 performs operations of performing various correction or compression to output image data, if necessary. The imaging device 701 may include an AD conversion unit that generates a digital signal processed in the signal processing unit 708. The AD conversion unit may be formed in a semiconductor layer (a semiconductor substrate) in which photoelectric converters of the imaging device 701 are formed or may be formed on a different semiconductor substrate from the semiconductor layer in which the photoelectric converter of the imaging device 701 is formed. Further, the signal processing unit 708 may be formed on the same semiconductor substrate as the imaging device 701.

Furthermore, the imaging system 700 includes a memory unit 710 for temporarily storing image data therein and an external interface unit (external I/F unit) 712 for communicating with an external computer or the like. The imaging system 700 further includes a storage medium 714 such as a semiconductor memory for performing storage or readout of imaging data and a storage medium control interface unit (storage medium control I/F unit) 716 for performing storage or readout on the storage medium 714. Note that the storage medium 714 may be embedded in the imaging system 700 or may be removable.

Furthermore, the imaging system 700 includes a general control/operation unit 718 that performs various calculation and controls the entire digital still camera and a timing generation unit 720 that outputs various timing signals to the imaging device 701 and the signal processing unit 708.

Here, the timing signal or the like may be input from the outside, and the imaging system 700 includes at least the imaging device 701 and the signal processing unit 708 that processes an output signal output from the imaging device 701.

The imaging device 701 outputs an imaging signal to the signal processing unit 708. The signal processing unit 708 performs predetermined signal processing on an imaging signal output from the imaging device 701 and outputs image data. The signal processing unit 708 uses an imaging signal to generate an image.

As described above, according to the present embodiment, the imaging system to which the imaging device 1 according to any of the first to third embodiments is applied can be realized.

Fifth Embodiment

Figure 15A:
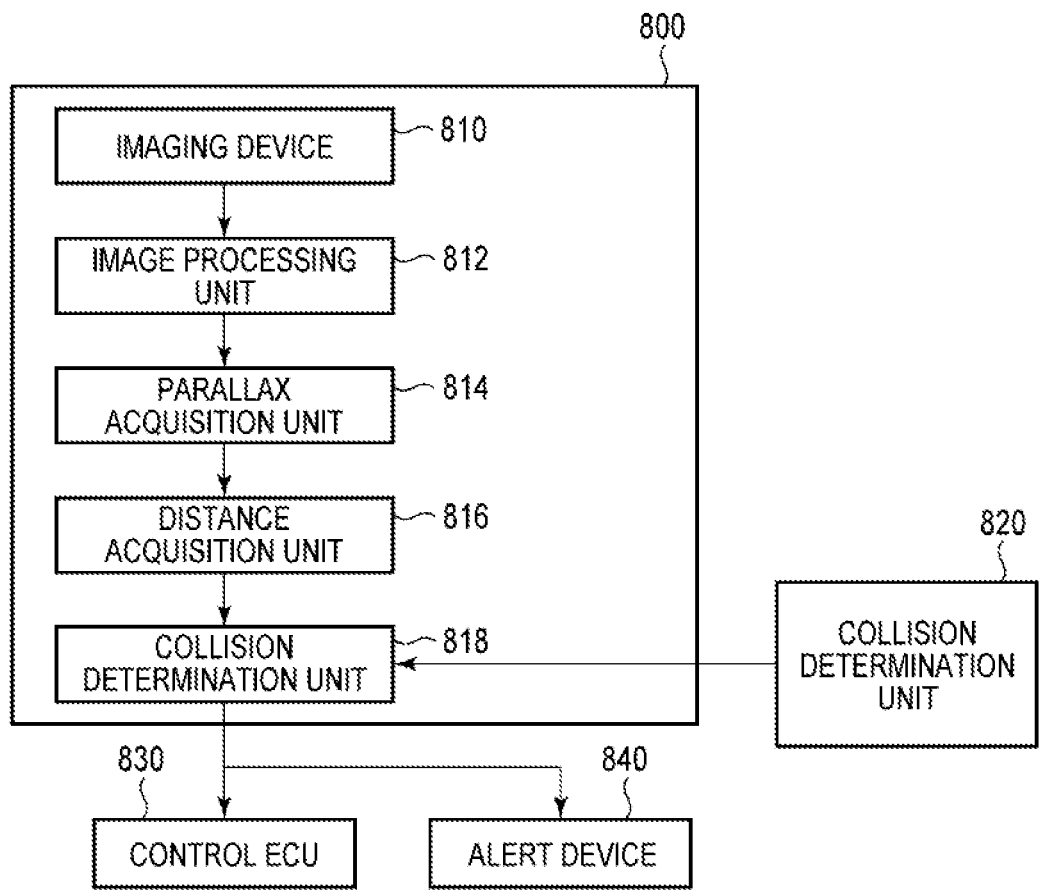
FIG. 15A is a diagram illustrating a configuration example of an imaging system according to a fifth embodiment of the present invention.
Figure 15B:
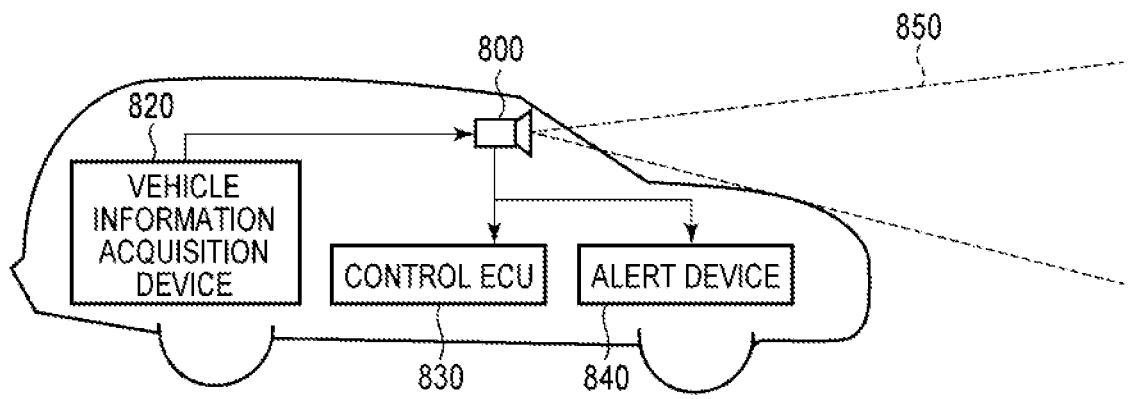
FIG. 15B is a diagram illustrating a configuration example of a movable object according to the fifth embodiment of the present invention.

An imaging system and a movable object according to a fifth embodiment of the present invention will be described with reference to FIG. 15A and FIG. 15B. FIG. 15A is a diagram illustrating a configuration of the imaging system according to the present embodiment. FIG. 15B is a diagram illustrating a configuration of the movable object according to the present embodiment.

FIG. 15A illustrates an example of an imaging system related to an on-vehicle camera. An imaging system 800 includes an imaging device 810. The imaging device 810 is the imaging device 1 described in any of the above first to third embodiments. The imaging system 800 includes an image processing unit 812 that performs image processing on a plurality of image data acquired by the imaging device 810 and a parallax acquisition unit 814 that calculates a parallax (a phase difference of parallax images) from the plurality of image data acquired by the imaging system 800. Further, the imaging system 800 includes a distance acquisition unit 816 that calculates a distance to the object based on the calculated parallax and a collision determination unit 818 that determines whether or not there is a collision possibility based on the calculated distance. Herein, the parallax acquisition unit 814 and the distance acquisition unit 816 are an example of a distance information acquisition unit that acquires distance information on the distance to the object. That is, the distance information is information on a parallax, a defocus amount, a distance to an object, or the like. The collision determination unit 818 may use any of the distance information to determine the collision possibility. The distance information acquisition unit may be implemented by dedicatedly designed hardware or may be implemented by a software module. Further, the distance information acquisition unit may be implemented by a field programmable gate array (FPGA), an application specific integrated circuit (ASIC), or the like or may be implemented by a combination thereof.

The imaging system 800 is connected to the vehicle information acquisition device 820 and can acquire vehicle information such as a vehicle speed, a yaw rate, a steering angle, or the like. Further, the imaging system 800 is connected to a control ECU 830, which is a control device that outputs a control signal for causing a vehicle to generate braking force based on a determination result by the collision determination unit 818. Further, the imaging system 800 is also connected to an alert device 840 that issues an alert to the driver based on a determination result by the collision determination unit 818. For example, when the collision probability is high as the determination result of the collision determination unit 818, the control ECU 830 performs vehicle control to avoid a collision or reduce damage by applying a brake, pushing back an accelerator, suppressing engine power, or the like. The alert device 840 alerts a user by sounding an alert such as a sound, displaying alert information on a display of a car navigation system or the like, providing vibration to a seat belt or a steering wheel, or the like.

In the present embodiment, an area around a vehicle, for example, a front area or a rear area is captured by using the imaging system 800. FIG. 15B illustrates the imaging system when a front area of a vehicle (a capturing area 850) is captured. The vehicle information acquisition device 820 transmits an instruction to the imaging system 800 or the imaging device 810. Such a configuration can further improve the ranging accuracy.

Although the example of control for avoiding a collision to another vehicle has been described above, the embodiment is applicable to automatic driving control for following another vehicle, automatic driving control for not going out of a traffic lane, or the like. Furthermore, the imaging system is not limited to a vehicle such as the subject vehicle and can be applied to a movable object (moving apparatus) such as a ship, an airplane, or an industrial robot, for example. In addition, the imaging system can be widely applied to a device which utilizes object recognition, such as an intelligent transportation system (ITS), without being limited to movable objects.

Modified Embodiments

The present invention is not limited to the embodiments described above, and various modifications are possible.

For example, an example in which a part of the configuration of any of the embodiments is added to another embodiment or an example in which a part of the configuration of any of the embodiments is replaced with a part of the configuration of another embodiment is also one of the embodiments of the present invention.

Further, the circuit configuration of the pixel P illustrated in the above embodiments is an example and not limited thereto. The pixel P may be any pixel as long as it is a pupil division pixel including at least a pair of a set of photoelectric converters that receive light that has passed through a pair of pupil regions and include at least two photoelectric converters. Further, the configuration of the readout circuit in a pixel is not limited to the configuration illustrated in FIG. 3 and can be changed as appropriate.

Further, although the embodiments described above are configured such that six output lines are arranged on each column of the pixel unit 104 and six rows of pixel signals are simultaneously output, the number of rows from which pixel signals are simultaneously output is not limited to six. Further, the number of rows for reducing data or the number of rows for summing data are not limited to those in the embodiments described above and can be changed as appropriate in accordance with the number of rows from which pixel signals are simultaneously output or the like.

Further, the imaging systems illustrated in the above fourth and fifth embodiments are examples of an imaging system to which the photoelectric conversion device of the present invention may be applied, and an imaging system to which the photoelectric conversion device of the present invention can be applied is not limited to the configuration illustrated in FIG. 14 and FIG. 15A.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-052797, filed Mar. 24, 2020, which is hereby incorporated by reference herein in its entirety.

What is claimed is:

1. An imaging device comprising:
a plurality of pixels arranged to form a plurality of rows and a plurality of columns, each of the plurality of pixels including a first photoelectric converter and a second photoelectric converter;
a plurality of output lines, wherein at least one of the plurality of output lines is arranged to each of the plurality of columns, and each of the plurality of output lines is connected to pixels on corresponding columns;
an analog-to-digital (AD) conversion unit that includes a plurality of column AD conversion circuits each provided in association with the plurality of output lines, and converts analog signals output from each of the plurality of output lines into digital signals in parallel;
a first storage unit that includes a plurality of holding units each provided in association with the plurality of column AD conversion circuits, and holds the digital signals generated by the AD conversion unit;
a transfer unit that transfers the digital signals held in the first storage unit;
a second storage unit that holds the digital signals transferred from the transfer unit; and
an output unit that externally outputs the digital signals held in the second storage unit,
wherein each of the plurality of pixels outputs a first analog signal based on a signal from the first photoelectric converter a second analog signal based on a signal from the first photoelectric converter and the second photoelectric converter,
wherein the AD conversion unit is configured to convert each of the first analog signals into a first digital signal and convert each of the second analog signals into a second digital signal, and
wherein out of the digital signals output by the output unit, the number of signals corresponding to the first digital signals is less than the number of the first analog signals output in parallel from the plurality of output lines.

2. The imaging device according to claim 1,
wherein the plurality of output lines includes a first number of output lines on each column, and the first number is greater than or equal to two, and
wherein the first number of output lines arranged on the same column are connected to the pixels arranged on different rows on a corresponding column.

3. The imaging device according to claim 2,
wherein the output unit is configured to simultaneously output the digital signals in a unit of a second number of rows, and
wherein the first number is an integral multiple of the second number.

4. The imaging device according to claim 1 further comprising a selection unit that selects a part of the first digital signals held in the second storage unit and outputs the part of the first digital signals to the output unit.

5. The imaging device according to claim 1, wherein the AD conversion unit converts a part of the first analog signals output in parallel from the plurality of output lines into the first digital signals.

6. The imaging device according to claim 1, wherein the transfer unit transfers a part of the first digital signals held in the first storage unit to the second storage unit.

7. The imaging device according to claim 1 further comprising an adder unit that sums the first digital signals held in the second storage unit in a unit of a predetermined number of the first digital signals and outputs to the output unit, wherein the predetermined number is greater than or equal to two.

8. The imaging device according to claim 1, wherein the output unit outputs the second digital signals corresponding to the second analog signals output in parallel from the plurality of output lines.

9. The imaging device according to claim 1 further comprising:
a counter; and
a control unit that controls a timing to read out the digital signals in accordance with a count value of the counter.

10. The imaging device according to claim 1,
wherein the AD conversion unit
converts the first analog signals into the first digital signals in a first AD conversion period and stores the converted first digital signals in the first storage unit, and
converts the second analog signals into the second digital signals in a second AD conversion period, which is different from the first AD conversion period, and stores the converted second digital signals in the first storage unit.

11. The imaging device according to claim 1,
wherein the first digital signals are signals used for focus detection, and
wherein the second digital signals are signals used for image generation.

12. An imaging system comprising:
the imaging device according to claim 1; and
a signal processing unit that processes signals output from the imaging device.

13. A movable object comprising:
the imaging device according to claim 1;
a distance information acquisition unit that acquires distance information on a distance to an object, from a parallax image based on the first digital signals; and
a control unit that controls the movable object based on the distance information.

14. An imaging device comprising:
a plurality of pixels arranged to form a plurality of rows and a plurality of columns and including at least a first pixel and a second pixel;
a plurality of output lines including at least a first output line connected to the first pixel and a second output line connected to the second pixel;
an analog-to-digital (AD) conversion unit that includes at least a first AD conversion circuit provided in association with the first output line and a second AD conversion circuit provided in association with the second output line and converts an analog signal output from the first output line and an analog signal output from the second output line into digital signals in parallel;
a storage unit that holds the digital signals generated by the AD conversion unit; and
a transfer unit that transfers the digital signals held in the storage unit,
wherein each of the first pixel and the second pixel includes a first photoelectric converter and a second photoelectric converter, wherein each of the first pixel and the second pixel outputs a first analog signal based on a signal from the first photoelectric converter and a second analog signal based on a signal from the first photoelectric converter and the second photoelectric converter, wherein the storage unit holds a first digital signal converted from the first analog signal of the first pixel, a second digital signal converted from the second analog signal of the first pixel, a third digital signal converted from the first analog signal of the second pixel, and a fourth digital signal converted from the second analog signal of the second pixel, and wherein the transfer unit transfers the second digital signal, the third digital signal, and the fourth digital signal but does not transfer the first digital signal.

15. The imaging device according to claim 14, wherein the first digital signal and the third digital signal are signals used for focus detection, and wherein the second digital signal and the fourth digital signal are signals used for image generation.

* * * * *